United States Patent
Carter, III et al.

(10) Patent No.: US 11,183,802 B2
(45) Date of Patent: Nov. 23, 2021

(54) IN-FLOOR ELECTRICAL FITTING

(71) Applicant: The Wiremold Company, West Hartford, CT (US)

(72) Inventors: Albert Carter, III, West Hartford, CT (US); Timothy S. Bowman, Canton, CT (US); Marc Galasso, Beacon Falls, CT (US); Shaun Abbott, Middletown, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 0 days.

(21) Appl. No.: 16/725,398

(22) Filed: Dec. 23, 2019

(65) Prior Publication Data

US 2020/0203899 A1    Jun. 25, 2020

Related U.S. Application Data

(60) Provisional application No. 62/783,454, filed on Dec. 21, 2018.

(51) Int. Cl.
*H01R 13/74*     (2006.01)
*H01R 13/447*    (2006.01)

(52) U.S. Cl.
CPC ......... *H01R 13/745* (2013.01); *H01R 13/447* (2013.01)

(58) Field of Classification Search
CPC ...... H01R 13/518; H01R 13/73; H01R 13/74; H01R 13/745; H01R 13/447; H01R 24/76; H01R 25/006; H01B 25/006
USPC .......................... 439/215, 535, 536, 538, 925
See application file for complete search history.

(56) References Cited

U.S. PATENT DOCUMENTS

| | | | | |
|---|---|---|---|---|
| 5,932,845 | A * | 8/1999 | Lacy | H02G 3/14 |
| | | | | 174/67 |
| 6,417,446 | B1 * | 7/2002 | Whitehead | H02G 3/185 |
| | | | | 174/484 |
| 2009/0266574 | A1 * | 10/2009 | Atkinson | H01R 13/447 |
| | | | | 174/67 |
| 2014/0131088 | A1 * | 5/2014 | Drane | H02G 3/283 |
| | | | | 174/483 |
| 2020/0052432 | A1 * | 2/2020 | Byrne | H01R 13/5202 |
| 2020/0052471 | A1 * | 2/2020 | Byrne | H02G 3/14 |

\* cited by examiner

*Primary Examiner* — Oscar C Jimenez
(74) *Attorney, Agent, or Firm* — McCormick, Paulding & Huber PLLC

(57) ABSTRACT

An in-floor electrical fitting includes a lower body, an upper body detachably connected to the lower body, and at least one detachable retention clip movable between a first position in which a portion of the at least one detachable retention clip extends outwardly past a periphery of the body and a second position in which the portion of the at least one detachable retention clip is moved inward from the periphery of the body. An angular position of the upper body may be reconfigurable relative to the lower body into at least two different orientations.

19 Claims, 17 Drawing Sheets

IN-FLOOR ELECTRICAL FITTING

CROSS-REFERENCE TO RELATED APPLICATIONS

This application claims priority to U.S. Provisional Patent Application No. 62/783,454 filed Dec. 21, 2018, which is hereby incorporated by reference herein in its entirety.

TECHNICAL FIELD

The present disclosure relates to in-floor electrical fittings.

BACKGROUND

In-floor electrical fittings provide power and data connections at the floor-level in the interior of a room so that power and data cables do not have to be routed to the room walls to make the necessary electrical connections, thereby preventing tripping hazards and improving room aesthetics. For example, one or more in-floor fittings could be installed below a conference table so that power and data cables connected to electronic devices sitting on the table can connect to building AC power and building computer networks without extending past the footprint of the table.

One particular category of in-floor electrical fittings is a poke-thru fitting. A poke-thru fitting passes through the entire thickness of a concrete floor so that power and data cables can be connected through the plenum space between the room floor of one building floor and the ceiling of the building floor below. As such, power and data cables do not need to be routed to the fitting through conduits within the concrete floor itself.

Once installed in a hole in a floor, UL safety requirements specify that a poke-thru fitting must be able to withstand 50 lbs of pulling force without becoming dislodged from the hole. This ensures that the fitting remains properly installed in the floor, even if a cable coming from the fitting is pulled.

With changes in modern wiring needs and modifications to wiring standards and requirements, such as USB standards or the like, there is a need for reconfigurable in-floor fittings, and poke-thru fittings in particular, that are also able to be installed, uninstalled and reinstalled in holes in a floor while still complying with UL safety requirements.

SUMMARY

According to the present disclosure, an in-floor electrical fitting comprises a body forming a compartment, the body configured to be disposed in a hole in a floor. A flange is formed at an upper end of the body and has at least one opening into the compartment, the flange being configured to sit on a surface of the floor when the body is disposed in the hole. At least one detachable retention clip is secured to the body and may be accessible through the at least one opening in the flange. The at least one detachable retention clip is movable between a first position in which a portion of the at least one detachable retention clip extends outwardly past a periphery of the body to engage a side of the hole and a second position in which the portion of the at least one detachable retention clip is moved inward from the periphery of the body and is disengaged from the side of the hole.

According to the present disclosure, the at least one detachable retention clip may comprise two detachable retention clips. The two detachable retention clips may be disposed on opposite sides of the body. The portion of the at least one detachable retention clip may include a plurality of tabs. The at least one detachable retention clip may have at least one alignment feature configured to engage a corresponding alignment feature on the body when the at least one detachable retention clip is in the first position.

According to the present disclosure, the body may comprise a lower portion including first and second channels extending therethrough, and an upper portion detachably connected to the lower portion. An angular position of the upper portion may be reconfigurable relative to the lower portion into at least two distinct orientations.

According to the present disclosure, the upper portion including the flange may include a divider dividing the at least one opening into a first opening and a second opening. The upper portion may be reconfigurable between a first position in which the divider is positioned between the first and second channels so that the first channel is located below the first opening and the second channel is located below the second opening and a second position in which the divider is positioned over both the first and second channels so that a first portion of the first channel and a first portion of the second channel are located below the first opening and a second portion of the first channel and a second portion of the second channel are located below the second opening.

According to the present disclosure, the in-floor electrical fitting further comprises a cover configured to be disposed on an upper surface of the flange, the cover including at least one sliding door providing access to the compartment when in an open position and preventing access to the compartment when in a closed position. The cover may include a locking mechanism that automatically locks the least one sliding door when the at least one sliding door is in the closed position.

According to the present disclosure, an in-floor electrical fitting comprises a lower body including first and second channels extending therethrough, and an upper body detachably connected to the lower body. The upper body may include a flange formed at an end of the upper body distal from the lower body. The flange may have an opening divided into a first compartment and a second compartment by a divider. An angular position of the upper body may be reconfigurable relative to the lower body into at least two different orientations.

According to the present disclosure, the upper body is reconfigurable between a first position in which the divider is positioned between the first and second channels so that the first channel is located below the first compartment and the second channel is located below the second compartment and a second position in which the divider is positioned over both the first and second channels so that a first portion of the first channel and a first portion of the second channel are located below the first compartment and a second portion of the first channel and a second portion of the second channel are located below the second compartment.

According to the present disclosure, the upper body may comprise a mounting plate at an end of the upper body proximate the lower body. The mounting plate may detachably connect the upper body to the lower body. The in-floor electrical fitting may further comprise at least one detachable retention clip secured to the mounting plate and accessible through the opening in the flange. The at least one detachable retention clip may be movable between a first position in which a portion of the at least one detachable retention clip extends outwardly past a periphery of the mounting plate and a second position in which the portion of the at least one detachable retention clip is moved inward from the periphery of the mounting plate.

According to the present disclosure, the at least one detachable retention clip may comprise two detachable retention clips. The two detachable retention clips may be positioned on opposite sides of the mounting plate. The portion of the at least one detachable retention clip may include a plurality of tabs. The at least one detachable retention clip may include at least one alignment feature configured to engage a corresponding alignment feature on the mounting plate when the at least one detachable retention clip is in the first position.

According to the present disclosure, the in-floor electrical fitting may further comprise a cover configured to be disposed on an upper surface of the flange. The cover may comprise a first sliding door providing access to the first compartment when in an open position and preventing access to the first compartment when in a closed position, and a second sliding door providing access to the second compartment when in an open position and preventing access to the second compartment when in a closed position. The cover may also include locking mechanisms that automatically lock the first and second sliding doors when in the closed position.

According to the present disclosure, an in-floor electrical fitting comprises a lower body including first and second channels extending therethrough, and an upper body detachably connected to the lower body, the upper body including a flange formed at an end of the upper body distal from the lower body, the flange having an opening providing access to a compartment formed in at least one of the upper body or the lower body. The in-floor electrical fitting further comprises at least one detachable retention clip secured to the body and accessible through the opening in the flange, the at least one detachable retention clip being movable between a first position in which a portion of the at least one detachable retention clip extends outwardly past a periphery of the body and a second position in which the portion of the at least one detachable retention clip is moved inward from the periphery of the body. The in-floor electrical fitting further comprises a cover configured to be disposed on an upper surface of the flange, the cover including at least one sliding door providing access to the compartment when in an open position and preventing access to the compartment when in a closed position. The cover may include a locking mechanism that automatically locks the least one sliding door in the closed position when the at least one sliding door is moved to the closed position. An angular position of the upper body may be reconfigurable relative to the lower body into at least two different orientations.

Objects, features and advantages of the present disclosure will become apparent in light of the description of embodiments and features thereof, as enhanced by the accompanying figures.

DETAILED DESCRIPTION

Figure 1:
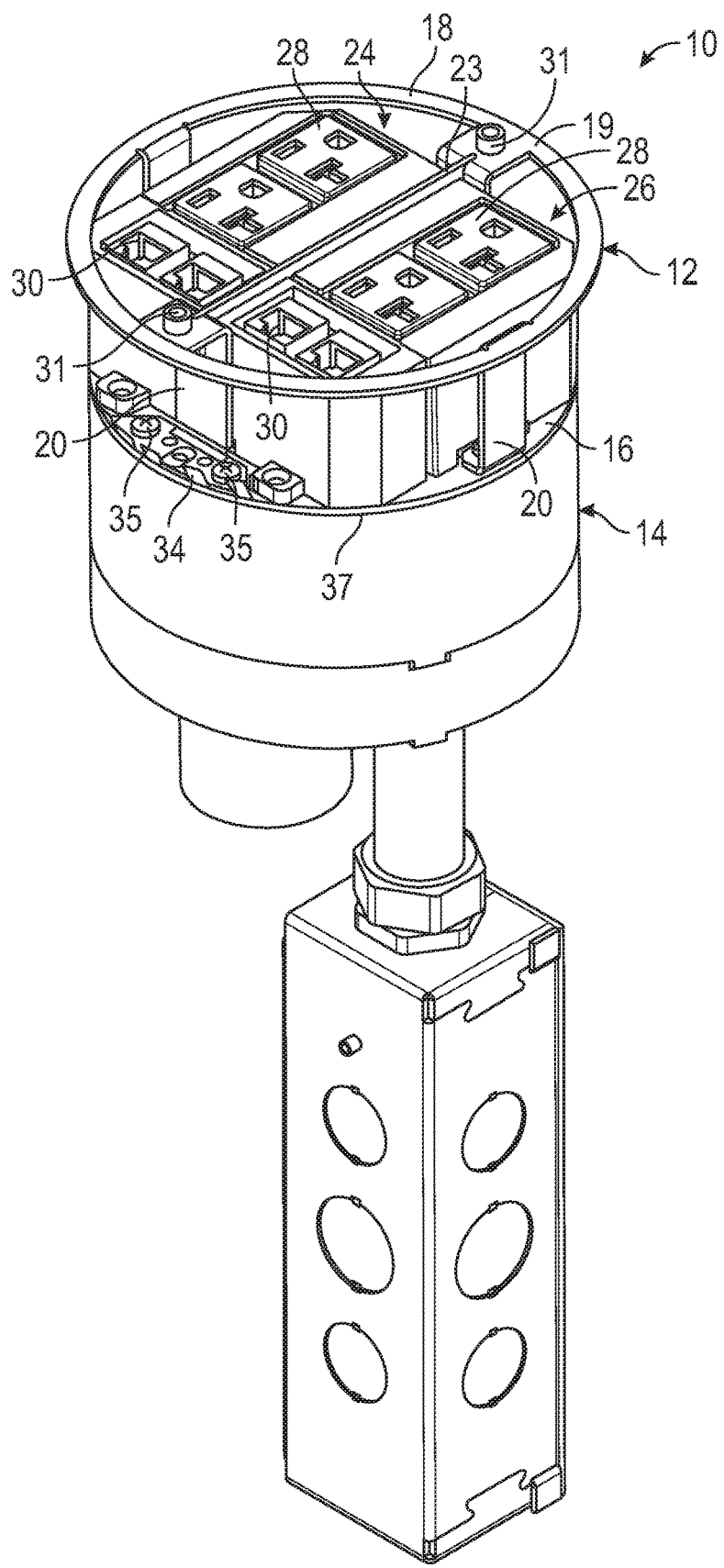
FIG. 1 is a perspective view of an exemplary poke-thru fitting in accordance with the present disclosure.

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

In the drawings, like reference numerals refer to like features of the in-floor fittings of the present application. Accordingly, although certain descriptions may refer only to certain figures and reference numerals, it should be understood that such descriptions might be equally applicable to like reference numerals in other figures. Additionally, although various features have been shown in different figures for simplicity, it should be readily apparent to one of skill in the art that the various features may be combined without departing from the scope of the present disclosure.

Figure 2:
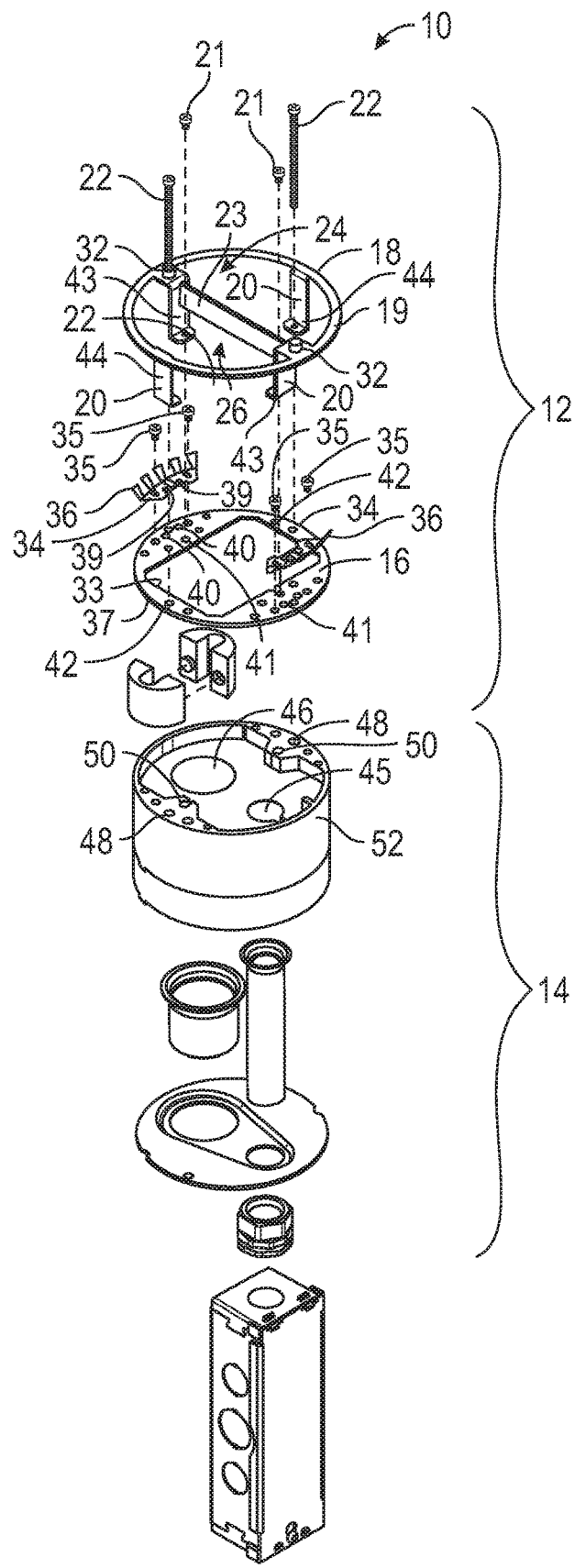
FIG. 2 is an exploded view of the poke-thru fitting shown in FIG. 1.

FIGS. 1 and 2 show an exemplary in-floor fitting 10 in accordance with the present disclosure. In-floor fitting 10 is a poke-thru fitting. It should be understood, however, that various features of the present disclosure are not limited to poke-thru fittings and may be equally applicable to other types of in-floor fittings. Poke-thru fitting 10 includes an upper body 12 and a lower body 14.

The upper body 12 includes a middle plate 16 that interfaces with the lower body 14 and a mounting ring 18 having a ring portion 19 configured to be disposed at the surface of a floor when the poke-thru fitting 10 is disposed in a hole in the floor. The mounting ring includes legs 20 extending downward from the ring portion 19 that connect the mounting ring 18 to the middle plate 16 through screws 21 and screws 22. For example, four legs 20 may be positioned at ninety-degree intervals around the ring portion 19. The screws 21 may be short screws that only connect the mounting ring 18 to the middle plate 16, while the screws 22 may be longer screws that connect both the mounting ring 18 and middle plate 16 to the lower body 14. The mounting ring 18 includes at least one divider 23 forming a first compartment 24 and a second compartment 26 in the mounting ring 18. For example, as shown, divider 23 extends between two opposing legs 20 forming equally sized compartments 24, 26. As seen in FIG. 1, each of the first compartment 24 and the second compartment 26 is configured to accommodate power receptacles 28 and/or data receptacles 30 therein. For example, each compartment 24, 26 is shown with two power receptacles 28 and two data receptacles 30. The power receptacles 28 may be, for example, standard two or three prong 125-volt or 250-volt AC outlets. The data receptacles 30 may be, for example, Ethernet ports, USB sockets, telephone jacks, and/or any other similar data receptacle. The front surfaces of the power and data receptacles 28, 30 face upwards and are recessed below top surface of the mounting ring 18.

Figure 6:
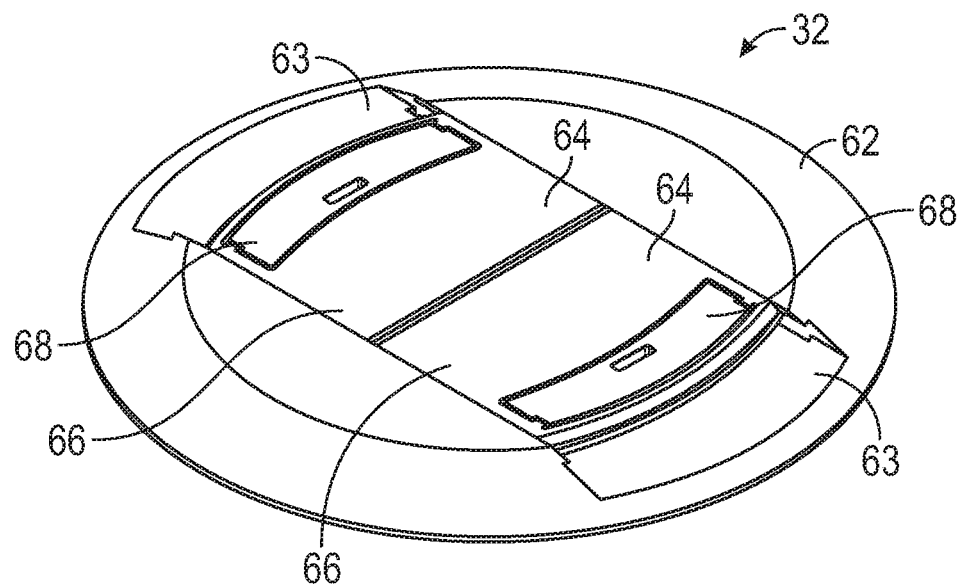
FIG. 6 is a perspective view of an exemplary cover for the poke-thru fitting shown in FIG. 1.
Figure 11:
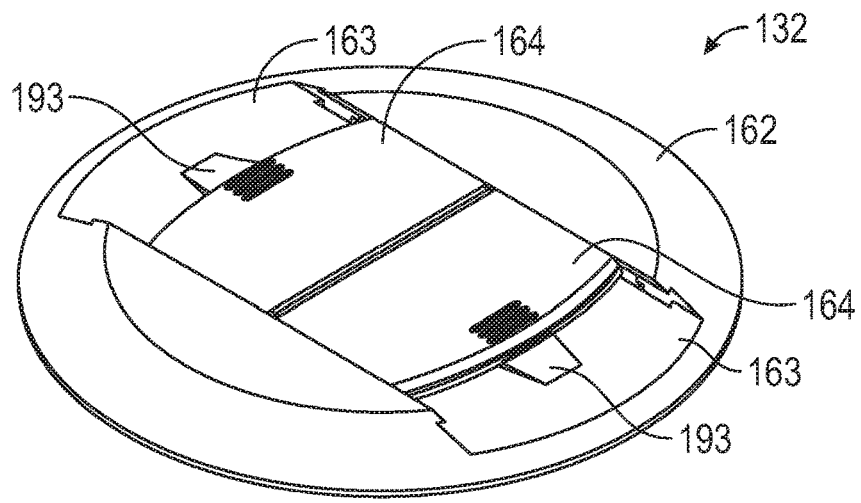
FIG. 11 is a perspective view of an exemplary cover for the poke-thru fitting shown in FIG. 1.

The mounting ring 18 may also include cover attachment members 31, which may be, for example, threaded holes or the like, for securing a cover or lid assembly, such as the cover assembly 32 shown in FIG. 6 or the exemplary cover 132 shown in FIG. 11, on the poke-thru fitting 10.

The middle plate 16 includes a central opening 33 configured to allow wiring and cabling to pass from the lower body 14 into the upper body 12. Retention clips 34 are attached to the middle plate 16 by screws 35, with each retention clip 34 including a plurality of tabs 36 that extend outward past a periphery 37 of the middle plate 16 when the retention clip 34 is secured thereto. The retention clips 34 and the middle plate 16 include corresponding alignment features 39 and 40, respectively, to ensure proper positioning of the retention clips 34 relative to the middle plate 16.

Referring to FIG. 2, the middle plate 16 further includes a pair of first mating holes 41 and a pair of second mating holes 42. The first mating holes 41 are formed opposite one another on the middle plate 16 radially inward from where the retention clips 34 attach to the middle plate 16. The second mating holes 42 are formed opposite one another proximate to the periphery 37 of the middle plate 16 and equally spaced between the pair of first mating holes 41. The mating holes 41 align with a first pair 43 of opposing legs 20 of the mounting ring 18 and the mating holes 42 align with a second pair 44 comprising the other two opposing legs 20 of the mounting ring 18. In the configuration shown in FIGS. 1 and 2, the shorter screws 21 secure the first pair 43 of opposing legs 20 to the middle plate 16 via the mating holes 41 and the longer screws 22 secure the second pair 44 comprising the other two opposing legs 20 to the middle plate 16 via the mating holes 42 and to the lower body 14. However, as will be described in greater detail below, the poke-thru fitting 10 is reconfigurable and, in some configurations, the shorter screws 21 secure the second pair 44 of opposing legs 20 to the middle plate 16 via the mating holes 42 and the longer screws 22 secure the first pair 43 of two opposing legs 20 to the middle plate 16 via the mating holes 41 and to the lower body 14.

Still referring to FIG. 2, the lower body 14 includes a power port 45 and a data port 46 extending longitudinally through the lower body 14. The power port 45 and data port 46 are configured to allow power wiring and data wiring, respectively, to extend through the lower body 14 while keeping the power wiring and data wiring separated from one another. The lower body also includes a pair of first attachment holes 48 and a pair of second attachment holes 50, each attachment hole 48, 50 extending longitudinally through the lower body 14. The first attachment holes 48 are formed proximate to an outer edge 52 of the lower body 14 and are spaced to so as to align with the second mating holes 42 of the middle plate 16 and the second pair 44 of two opposing legs 20 of the mounting ring 18. The second attachment holes 50 are formed radially inward from the first attachment holes 48 and have a spacing configured to align with the first mating holes 41 of the middle plate 16 and the first pair 43 of two opposing legs 20 of the mounting ring 18. The lower body 14 may be made of intumescent material to provide the poke-thru fitting 10 with the same or a better fire rating than the floor in which the poke-thru fitting 10 is installed, since intumescent material rapidly expands when heated to close openings through the poke-thru fitting 10 so that fire cannot pass therethrough.

Figure 3:
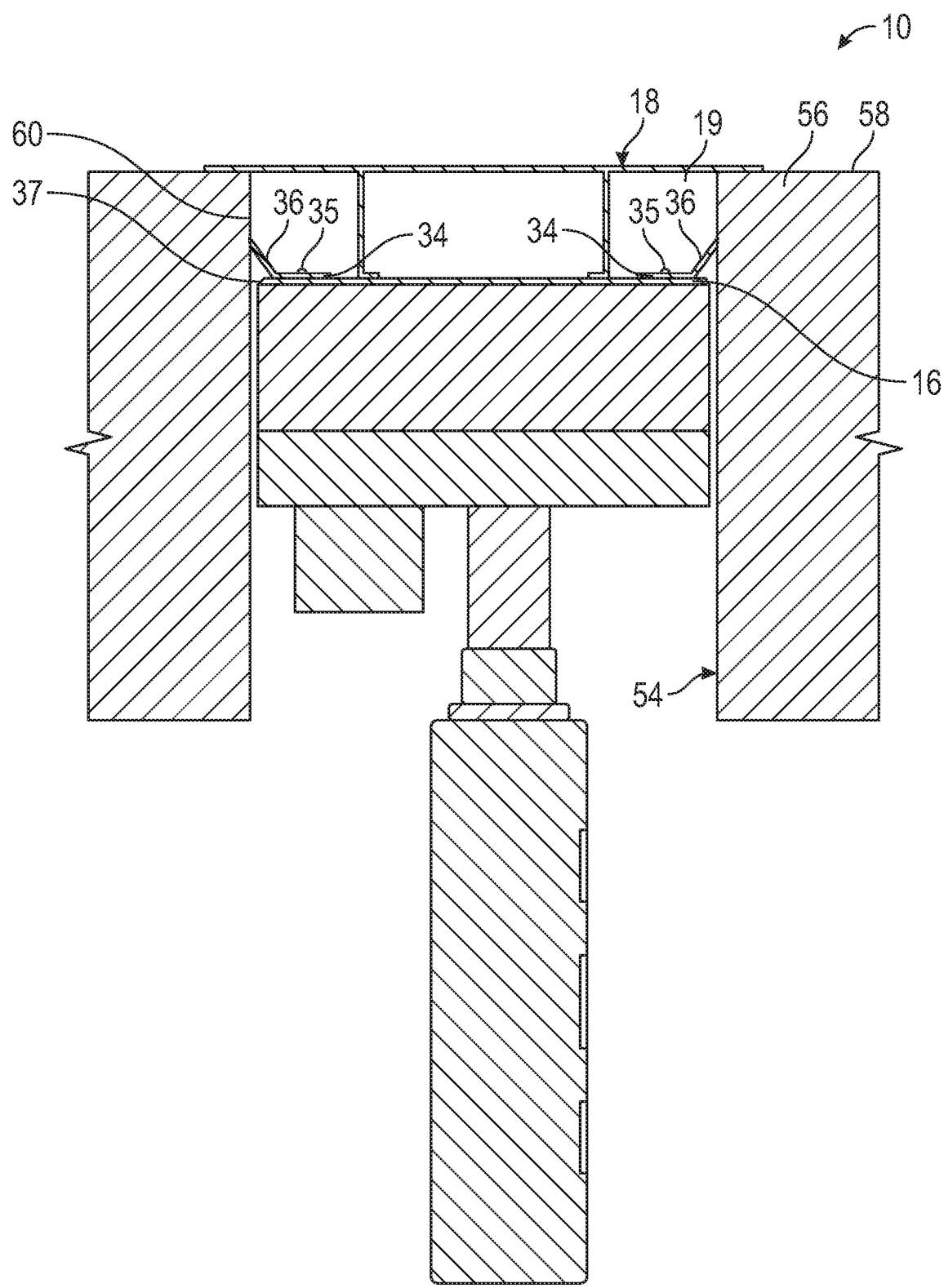
FIG. 3 is a side cross-sectional view of the poke-thru fitting shown in FIG. 1 installed in a floor.

Referring to FIG. 3, in operation, the poke-thru fitting 10 is installed in a hole 54 in a floor 56 by pushing the poke-thru fitting 10 downward into the hole 54 until the ring portion 19 of the mounting ring 18 engages an upper surface 58 of the floor 56. The tabs 36 of the retention clips 34 engage a wall 60 of the hole 54 to retain the poke-thru fitting 10 in the hole 54 in compliance with UL safety requirements. In particular, the engagement between the tabs 36 and the wall 60 allows the poke-thru fitting 10 to withstand 50 lbs of pulling force without becoming dislodged from the hole 54. This ensures that the poke-thru fitting 10 remains properly installed in the floor 56, even if a cable coming from the poke-thru fitting 10 is pulled.

The poke-thru fitting 10 has the ability to be uninstalled and reinstalled in the hole 54 (or another hole) while continuing to comply with the UL safety requirements for retention when installed in the hole 54 (or another hole). In particular, while the poke-thru fitting 10 is installed in the hole 54, the screw 35 securing the retention clips 34 to the middle plate 16 may still be accessed through the ring portion 19 of the mounting ring 18 and the first and second compartments 24, 26, as seen in FIG. 1. This allows the screws 35 to be loosened so that the retention clips 34 can be move inward from the periphery 37 or the middle plate 16 to disengage the wall 60 of the hole 54. The poke-thru fitting 10 may then be lifted upward out of the hole 54 without having to overcome the retaining force generated by the engagement of the tabs 36 with the wall 60 and without damaging the tabs 36 of the retention clips 34. The retention clips 34 may then be properly repositioned using the alignment features 39 and 40 of the retention clips 34 and middle plate 16, respectively, and the screws 35 may be tightened to secure the retention clips 34 to the middle plate 16 in the proper position.

The poke-thru fitting 10 may then be reinstalled in the hole 54 (or another hole) in the floor 56 by pushing the poke-thru fitting 10 downward into the hole 54 (or other hole) until the ring portion 19 of the mounting ring 18 engages an upper surface 58 of the floor 56. The tabs 36 of the retention clips 34 once again engage the wall 60 of the hole 54 to retain the poke-thru fitting 10 in the hole 54 in compliance with UL safety requirements.

Figure 4:
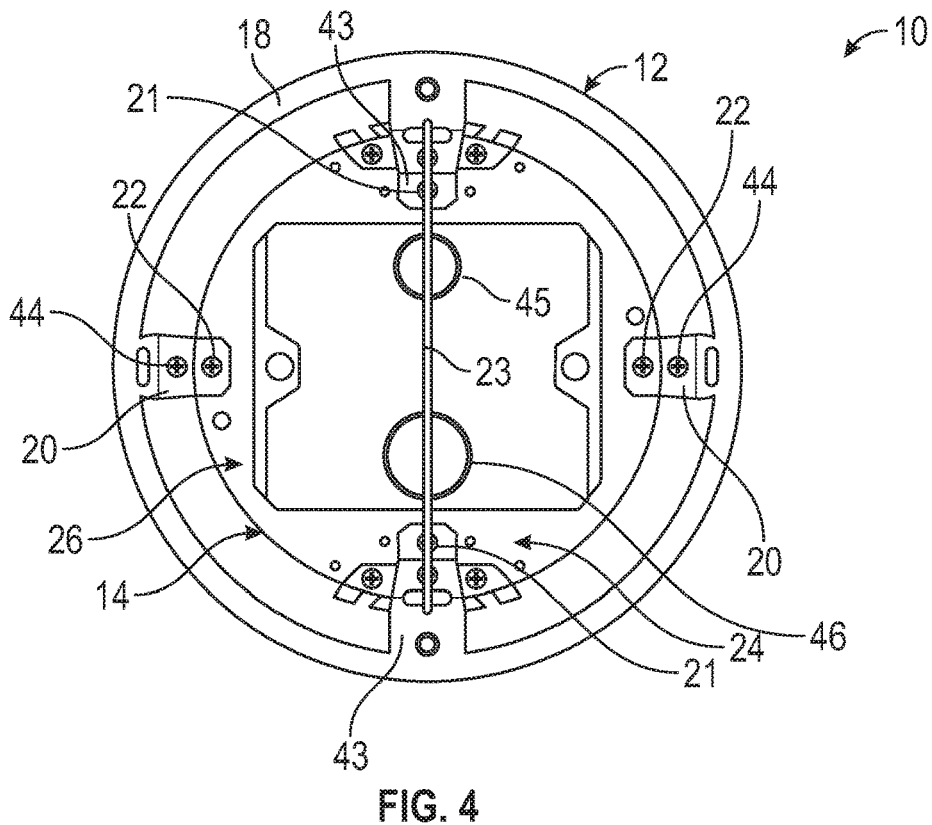
FIG. 4 is a top view of the poke-thru fitting shown in FIG. 1 in a first configuration.

Referring to FIG. 4, the poke-thru fitting 10 is shown in a first configuration with the divider 23 of the mounting ring 18 intersecting both the power port 45 and the data port 46 of the lower body 14. Thus, both the power port 45 and the data port 46 are shared by and accessible to the first compartment 24 and the second compartment 26 formed by the divider 23, which allows both power receptacles 28 and data receptacles 30 to be installed in the first compartment 24 and second compartment 26 as shown in FIG. 1. In the first configuration, the first attachment holes 48 of the lower body 14 are aligned with the second mating holes 42 of the middle plate 16, and the second pair 44 of two opposing legs 20 of the mounting ring 18. The longer screws 22 extend through the second pair 44 of two opposing legs 20, the second mating holes 42, and the first attachment holes 48 to connect the upper body 12 to the lower body 14. The shorter screws 21 secure the first pair 43 of opposing legs 20 to the middle plate 16 via the mating holes 41.

Figure 5:
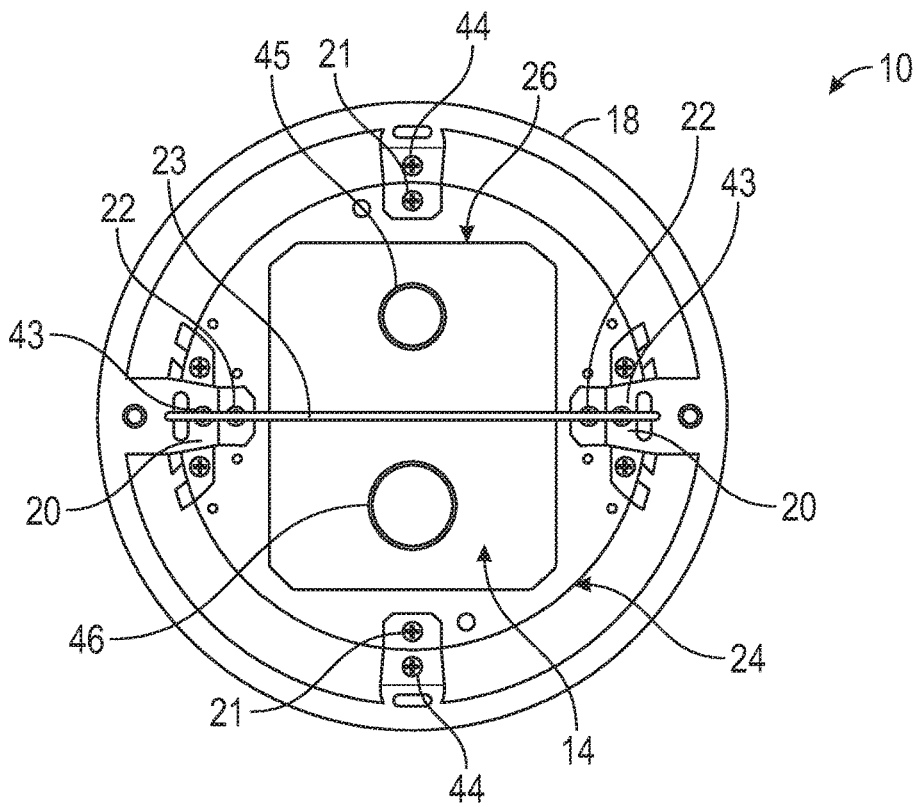
FIG. 5 is a top view of the poke-thru fitting shown in FIG. 1 in a second configuration.

Referring to FIG. 5, the poke-thru fitting 10 is shown in a second configuration with the divider 23 of the mounting ring 18 rotated ninety degrees relative to the first configuration shown in FIG. 4 so that the divider 23 passes between the power port 45 and the data port 46 of the lower body 14. Thus, the power port 45 is accessible to the first compartment 24 and the data port 46 is accessible to the second compartment 26. The second configuration is beneficial where only power receptacles 28 are installed in the first compartment 24 and where only data receptacles 30 are installed in the second compartment 26. In the second configuration, the second attachment holes 50 of the lower body 14 are aligned with the first mating holes 41 of the middle plate 16, and the first pair 43 of two opposing legs 20 of the mounting ring 18. The longer screws 22 extend through the first pair 43 of two opposing legs 20, the first mating holes 41, and the second attachment holes 50 to connect the upper body 12 to the lower body 14. The shorter screws 21 secure the second pair 44 of opposing legs 20 to the middle plate 16 via the mating holes 42.

The poke-thru fitting 10 may advantageously be reconfigured between the first configuration shown in FIG. 4 and the second configuration shown in FIG. 5, and vice versa, by removing the screws 21, 22, rotating the upper body 12 relative to the lower body 14, and reinstalling the screws 21, 22 into the appropriate holes as described above. This reconfiguration may be done whenever the poke-thru fitting 10 is uninstalled from hole 54 in the floor 56, for example initially prior to installation or when removed from the hole 54 as discussed above. Although only first and second configurations have been described for simplicity, it should be apparent from the present disclosure, that third and fourth configurations may be achieved by continuing to rotate the upper body 12 relative to the lower body 14 at ninety-degree intervals. Thus, the poke-thru fitting 10 includes four configurations at ninety-degree intervals of rotation relative to one another. It should also be apparent from the present disclosure that the number of configurations may be increased and the degree or rotation between configurations decreased by providing additional legs 20 and associated mounting/mating holes.

Accordingly, the poke-thru fitting 10 may advantageously be installed/reinstalled and/or configured/reconfigured to accommodate a variety of different wiring needs as wiring requirements and/or wiring standards change, while still complying with UL safety requirements.

Referring to FIG. 6, an exemplary cover assembly 32 for the poke-thru fitting 10 is shown. The cover assembly 32 includes a flanged body 62 and doors 64 that are slidable relative to the flanged body 62 in recess 63. The doors 64 each include a panel 66 that slidably engages the body 62 and a handle 68 that is pivotably attached to the panel 66 and provides a locking mechanism for the door 64 as described below.

Figure 7:
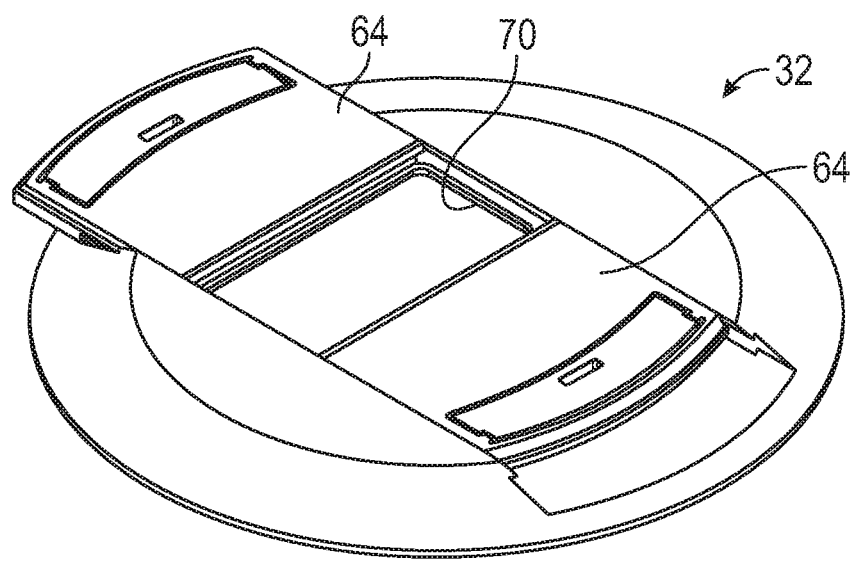
FIG. 7 is a perspective view of the exemplary cover of FIG. 6, with an open door.

The body 62 is configured to be secured to the poke-thru fitting 10 at the cover attachment members 31, shown in FIG. 1, such that a lower surface of the body 62 sits on the upper surface 58 of the floor 56, shown in FIG. 3, when the poke-thru fitting 10 is installed in the floor 56 as shown in FIG. 3. Each door 64 is slidable relative to the body 62 between a first position, shown in FIG. 6, in which the door 64 closes an opening 70, shown in FIG. 7, through the body 62 and a second position, shown in FIG. 7, in which the door 64 exposes the opening 70 to allow access to the first compartment 24 and/or the second compartment 26 of the poke-thru fitting 10 and to the power receptacles 28 and/or data receptacles 30 installed therein in the manner shown in FIG. 1. As seen in FIG. 7, one door 64 is shown as being in the open position and one door 64 is shown as being in the closed position. The cover assembly 32 may be positioned on the poke-thru assembly 10 so that the door 64 in the open position provides access to the receptacles 28 and/or data receptacles 30 through the opening 70 in only one of the first or second compartments 24,26, while the other door 64 shown in the closed position opens to provide access to the receptacles 28 and/or data receptacles 30 in the other of the first or second compartments 24,26.

Figure 8:
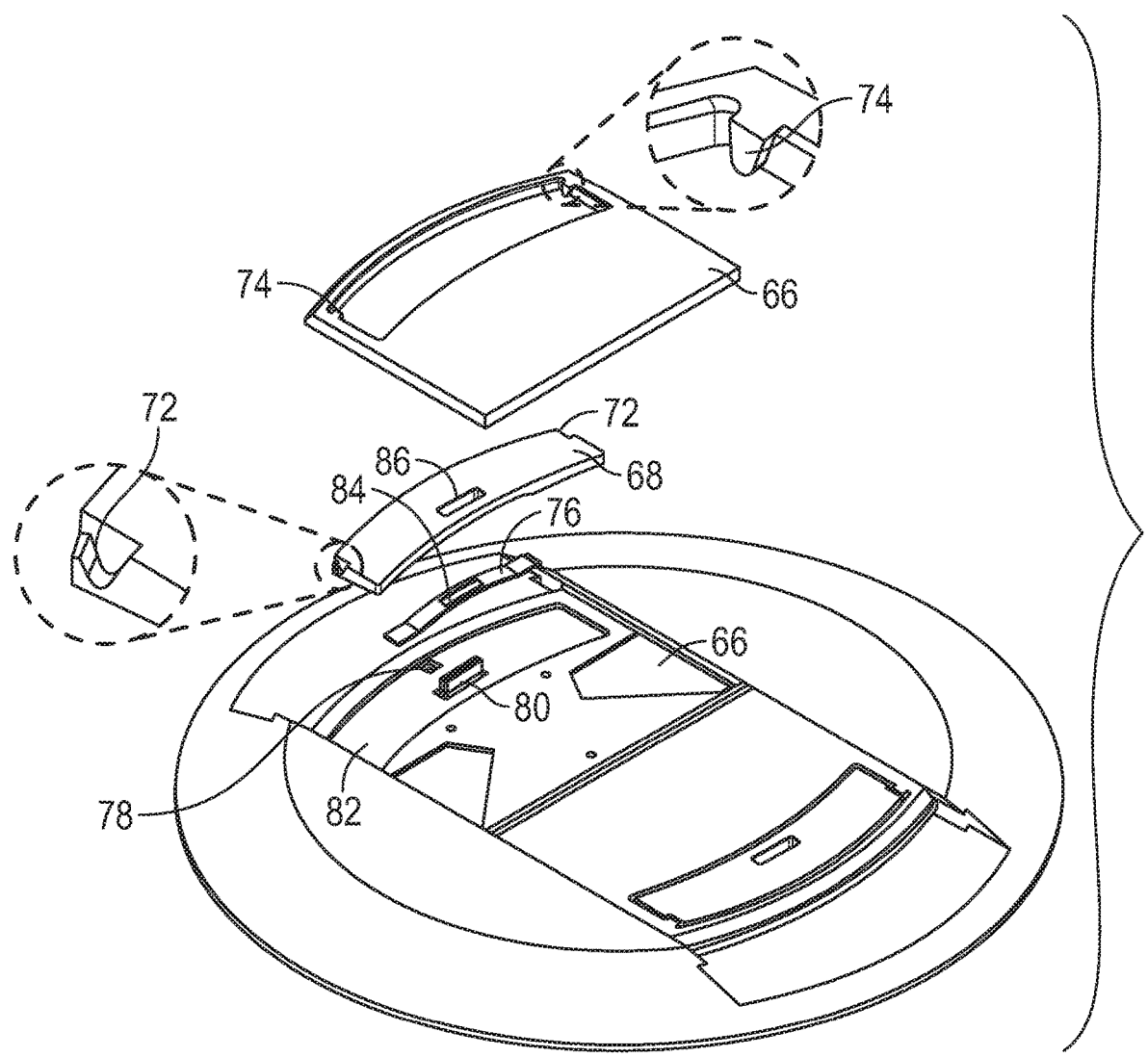
FIG. 8 is a partially exploded perspective view of the exemplary cover of FIG. 6.

Referring to FIG. 8, as discussed above, the handle 68 is pivotably attached to the panel 66. For example, the handle 68 and panel 66 may include corresponding sockets 72 and projections 74 that engage one another to provide the pivotable coupling between the handle 68 and the panel 66. Alternatively, the pivotable coupling between the handle 68 and the panel 66 may be achieved through any other known pivotal coupling technique such as an axle and through bore or the like. A biasing member 76, such as a flat spring as shown or any other similar resilient member, is disposed between the handle 68 and panel 66 to bias the handle toward a neutral position relative to the panel 66. The panel 66 includes an opening 78 that extends entirely through the panel 66 and may also include a projection 80 extending upward from a surface portion 82 of the panel 66 that is disposed below the handle 68. The projection 80 engages a corresponding channel 84 formed through the biasing member 76 to maintain a relative position of the biasing member 76 relative to the panel 66 and handle 68. The handle 68 may also include a channel 86 engaging the projection 80 to aid with maintaining relative positioning between the handle 68 and the panel 66.

Figure 9:
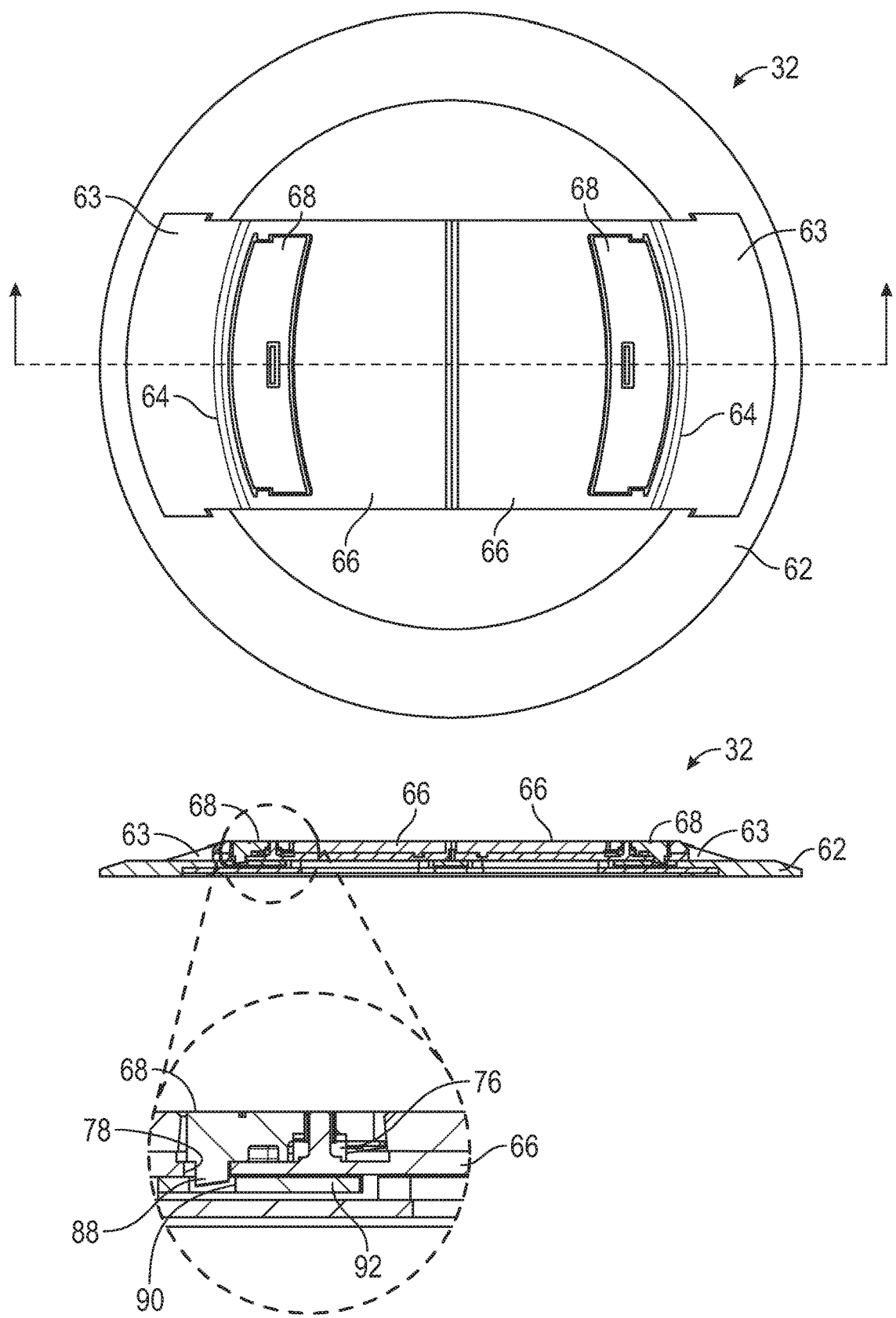
FIG. 9 is a cross-sectional and partially exploded view of the exemplary cover of FIG. 6 with doors in a locked state.

Referring to FIG. 9, the cover assembly 32 is shown with the handle 68 in the neutral position. The handle 68 includes a lock tab 88 that extends downward from the handle body through the opening 78 formed in the panel 66 and into an opening 90 formed in a fixed plate 92 below the panel 66. The fixed plate 92 may be, for example, part of the cover assembly 32, part of the poke-thru fitting 10, shown in FIG. 1, or a separate plate element positioned between the cover assembly 32 and the poke-thru fitting 10, shown in FIG. 1. By extending into the opening 90 of the fixed plate 92, the lock tab 88 prevents sliding movement of the door 64 within the recess 63 of the body 62. Thus, the engagement between the locking tab 88 and the opening 90 prevents the door 64 from moving to the open position shown in FIG. 7. The biasing member 76 generates bias that pivots the handle 68 toward the neutral position to maintain the door 64 in the locked state unless the bias is overcome.

Figure 10:
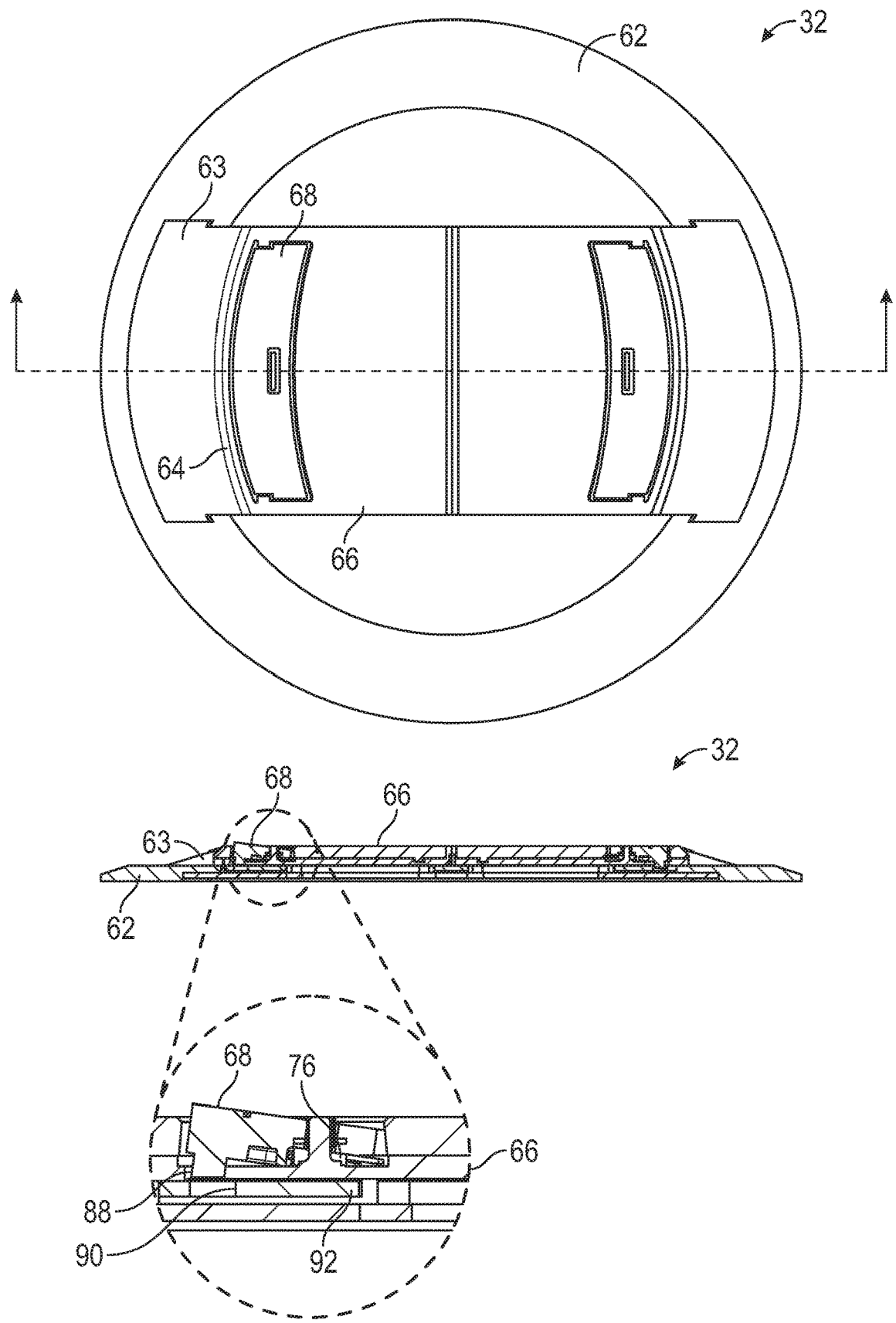
FIG. 10 is a cross-sectional and partially exploded view of the exemplary cover of FIG. 6 with a door in an unlocked state.

Referring to FIG. 10, the cover assembly 32 is shown with one handle 68 in an actuated position. To reach the actuated position, a downward force is applied to the top of the handle to overcome the bias generated by the biasing member 76, which causes the handle 68 to pivot from the neutral position to the actuated position. Rotation of the handle 68 as it pivots from the neutral position to the actuated position, lifts the locking tab 88 out of the opening 90 formed in the fixed plate 92 below the panel 66. This allows the door 64 to be moved in sliding motion within the recess 63 of the body 62 from the closed position to the open position shown in FIG. 7 to expose and allow access to the power receptacles 28 and/or data receptacles 30 through the opening 70 shown in FIG. 7. Once access to the power receptacles 28 and/or data receptacles 30 is no longer required, the door 64 may be returned to the closed position by moving the door 64 in sliding motion within the recess 63. When the door 64 reaches the closed position, the bias generated by the biasing member 76 causes the handle 68 to pivot back into the neutral position with the locking tab 88 engaging the opening 90 of the fixed plate 92, thereby automatically locking the door 64.

Each door 64 may be advantageously sized so that, when moved to the open position shown in FIG. 7, only the power receptacles 28 and/or data receptacles 30 installed within either the first compartment 24 or the second compartment 26 are exposed. Thus, each door 64 may advantageously provide access to a single compartment.

The doors 64 of the cover plate 32 also advantageously eliminate unexpected slipping hazards for persons walking on a floor though which the poke-thru fitting 10 with cover plate 32 is installed by locking the doors 64 when the doors 64 are closed. In particular, since the cover plate 32 is configured to sit on an upper surface of the floor and since the doors 64 may be similarly sized to the bearing surface of shoes or other footwear, unintended movement of either of the doors 64 when stepped on could be potentially hazardous to an unexpected traveler walking on the floor. The cover plate 32 advantageously prevents such unintended slipping by biasing the doors 64 into the locked position when closed.

Referring to FIG. 11, wherein like numerals represent like elements, another exemplary cover assembly 132 for the poke-thru fitting 10 is shown. The cover assembly 132 includes a flanged body 162, doors 164 that are slidable relative to the flanged body 162 in recess 163, and lock assemblies 193 positioned within the recess 163, each lock assembly 193 being configured to secure one door 164 in the closed position.

Figure 12:
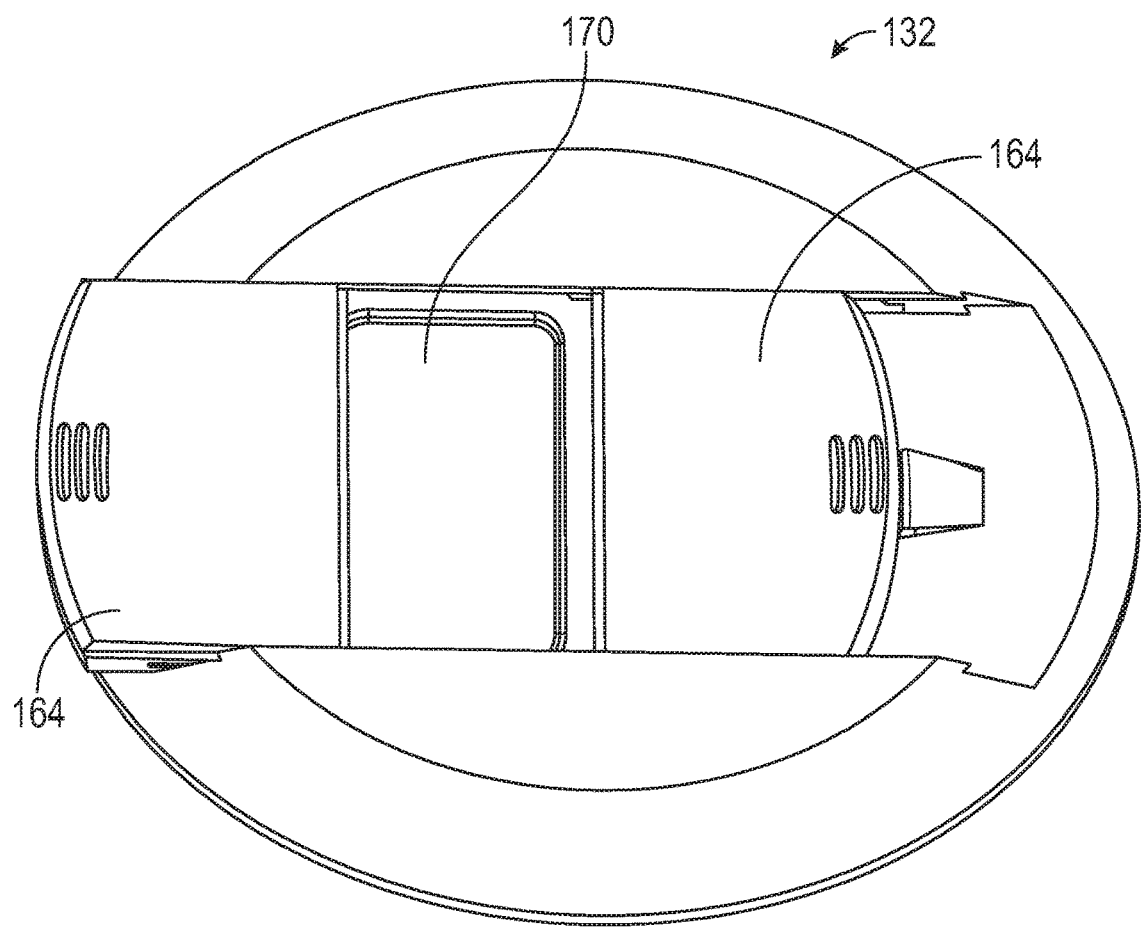
FIG. 12 is a top perspective view of the exemplary cover of FIG. 11, with an open door.

The flanged body 162 is configured to be secured to the poke-thru fitting 10 at the cover attachment members 31, shown in FIG. 1, such that a lower surface of the body 162 sits on the upper surface 58 of the floor 56, shown in FIG. 3, when the poke-thru fitting 10 is installed in the floor 56 as shown in FIG. 3. Each door 164 slidably engages the body 162 within the recess 163 and is slidable relative to the body 162 between a first position, shown in FIG. 11, in which the door 164 closes an opening 170, shown in FIG. 12, through the body 162 and a second position, shown in FIG. 12, in which the door 164 exposes the opening 170 to allow access to the first compartment 24 and/or the second compartment 26 of the poke-thru fitting 10 and to the power receptacles 28 and/or data receptacles 30 installed therein in the manner shown in FIG. 1. As seen in FIG. 12, one door 164 is shown as being in the open position and one door 164 is shown as being in the closed position. The cover assembly 132 may be positioned on the poke-thru assembly 10 so that the door 164 in the open position provides access to the receptacles 28 and/or data receptacles 30 through the opening 170 in only one of the first or second compartments 24,26, while the other door 164 shown in the closed position opens to provide access to the receptacles 28 and/or data receptacles 30 in the other of the first or second compartments 24,26.

Figure 13:
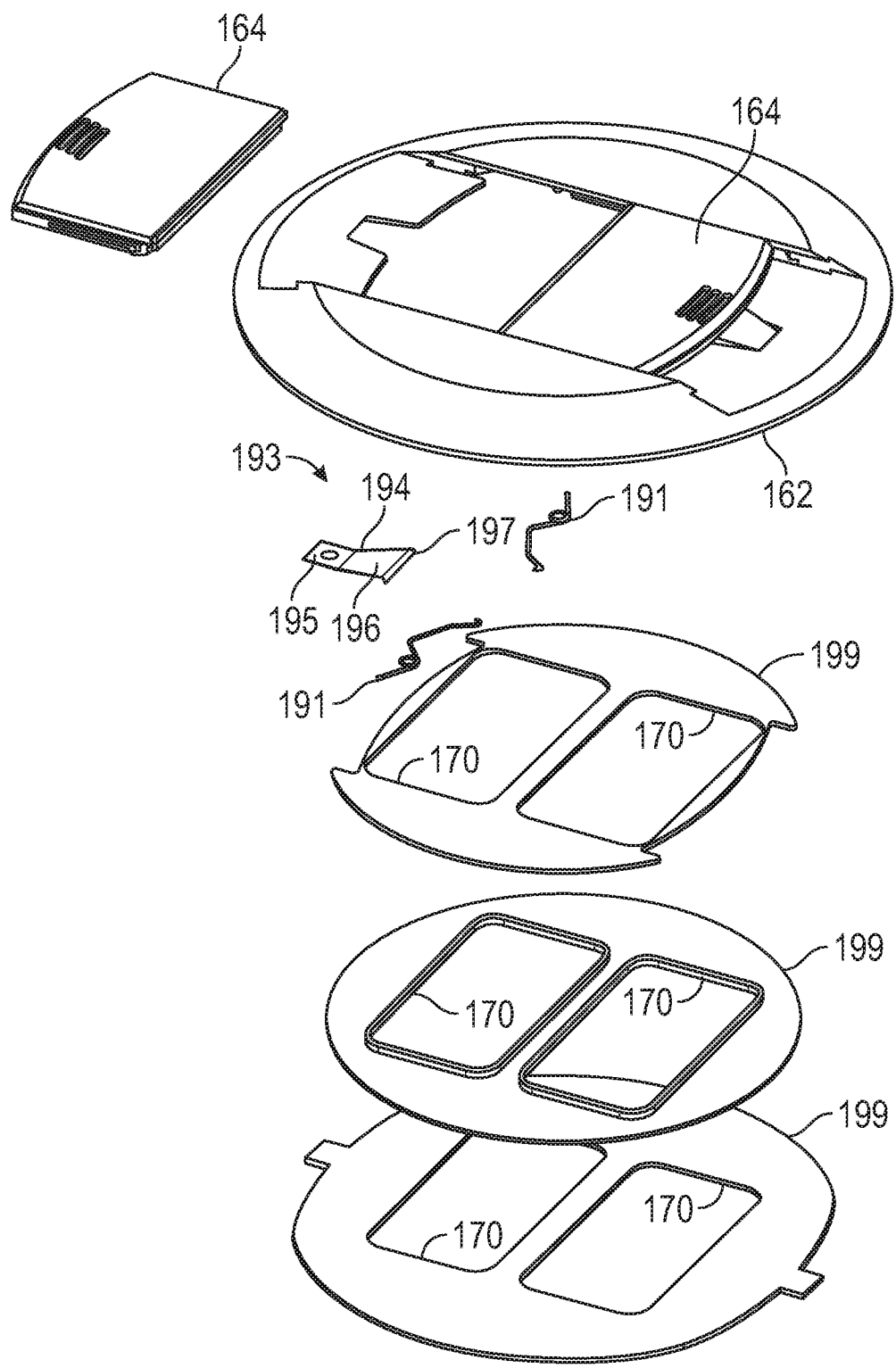
FIG. 13 is a partially exploded top perspective view of the exemplary cover of FIG. 11.
Figure 14:
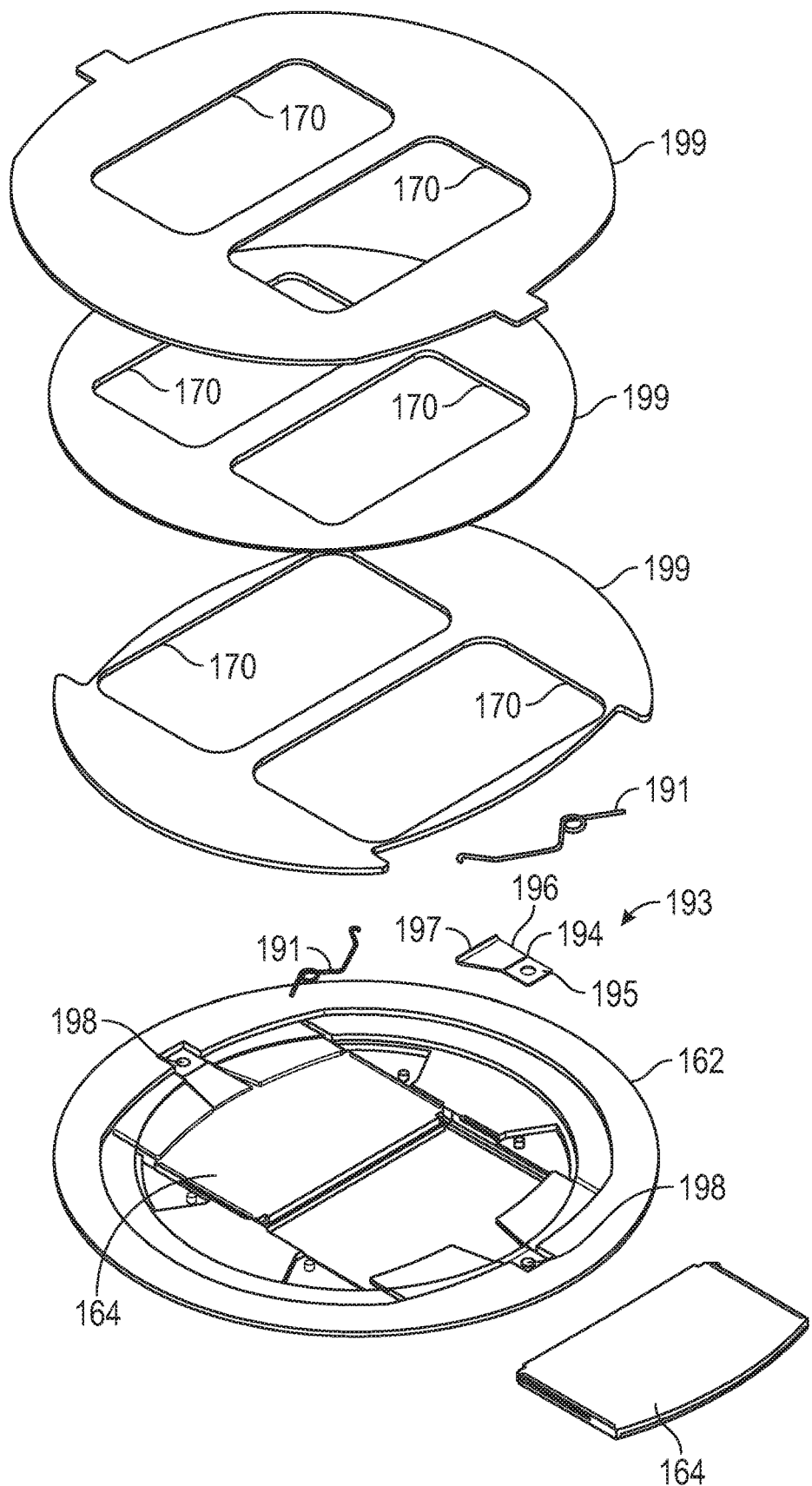
FIG. 14 is a partially exploded bottom perspective view of the exemplary cover of FIG. 11.

Referring to FIGS. 13 and 14, each locking assembly 193 includes a spring clip 194 secured to the flanged body 162. Each spring clip 194 includes a base portion 195 and a lock portion 196 that includes a stop 197 at its distal end. The base portion 195 of the spring clip 194 engages a post 198 of the flanged body 162, with one or more lower plates 199 preventing the base portion 195 from disengaging the post 198, thereby securing the spring clip 194 to the flanged body 162. Alternatively, the spring clip 194 may be secured to the flanged body 162 in various other known ways, such as being secured by a fastener such as a screw or the like.

As shown in FIGS. 13 and 14, the cover assembly 132 may also include springs 191 acting between the flanged body 162 and the doors 164 to bias the doors 164 toward the closed position. Additionally, the one or more lower plates 199 may form the openings 170 in addition to securing the base portion 195 of the spring clip 194 on the post 198.

Figure 15:
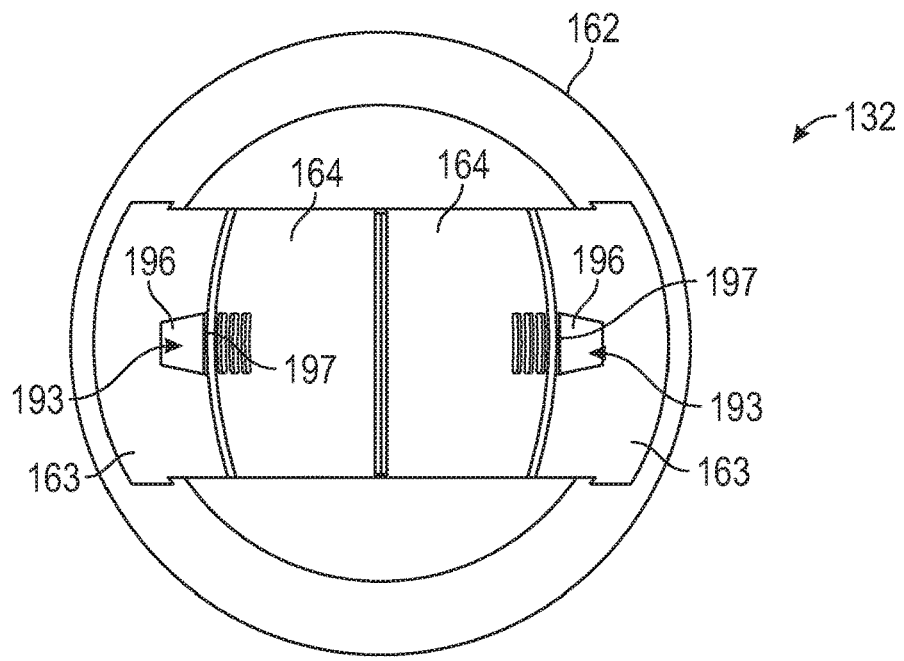
FIG. 15 is a top view of the exemplary cover of FIG. 11.
Figure 16:
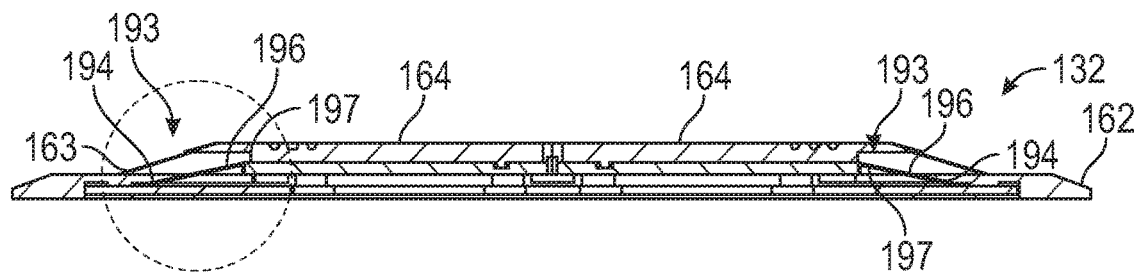
FIG. 16 is a cross-sectional view of the exemplary cover of FIG. 15.
Figure 17:
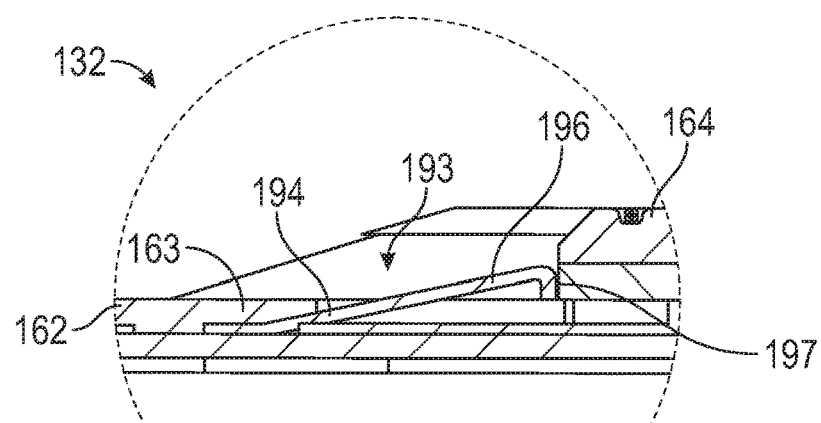
FIG. 17 is an exploded view of a portion of the exemplary cover of FIG. 16.

Referring to FIGS. 15-17, the cover assembly 132 is shown with the locking assembly 193 in a neutral position. In the neutral position, the lock portion 196 of the spring clip 194 extends upward from the recess 163, through a cutout or opening, so that the stop 197 contacts an end of the door 164. This contact with the end of the door 164 prevents sliding movement of the door 164 within the recess 163 of the body 162. Thus, when in the neutral position, the stop 197 prevents the door 164 from moving to the open position shown in FIG. 12.

Figure 18:
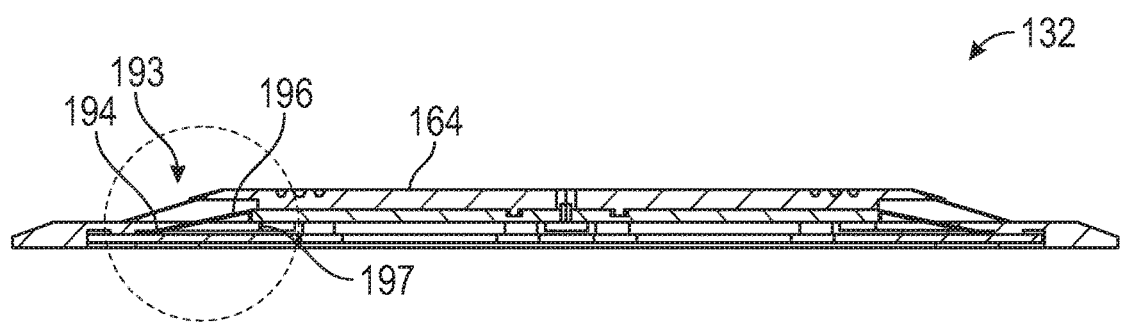
FIG. 18 is a cross-sectional view of the exemplary cover of FIG. 15 with a locking assembly actuated.
Figure 19:
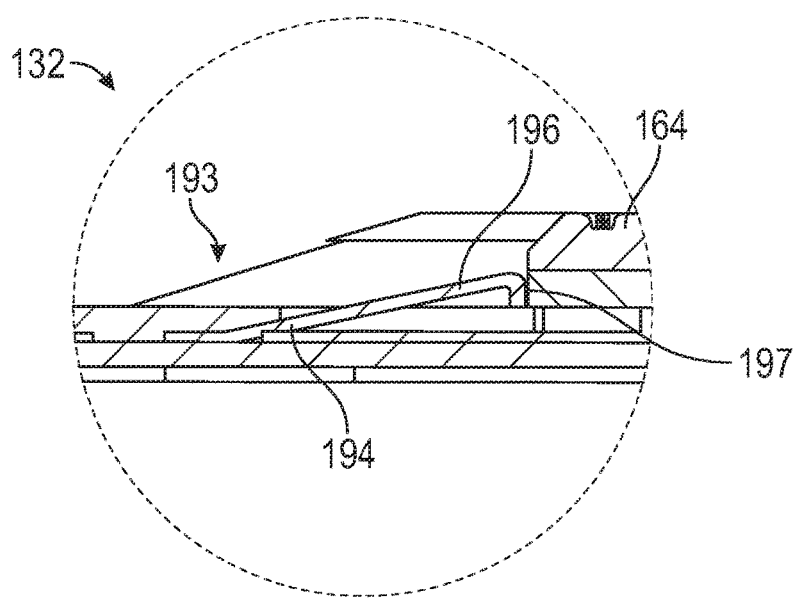
FIG. 19 is a cross-sectional view of a portion of the exemplary cover of FIG. 18 with the locking assembly actuated.

Referring to FIGS. 18 and 19, the cover assembly 132 is shown with one locking assembly 193 in an actuated position. To move the locking assembly 193 from the neutral position shown in FIGS. 15-17 to the actuated position shown in FIGS. 18 and 19, force is applied to the top of the locking portion 196 of the spring clip 194, causing the locking portion 196 and the stop 197 to deflect downward below the door 164. The force may be applied, for example, by a user pressing downward on the locking portion 196. When the force is removed, resiliency of the spring clip 194 causes the locking portion 196 to return to the neutral position in which the stop 197 prevents the door 164 from moving to the open position.

Figure 20:
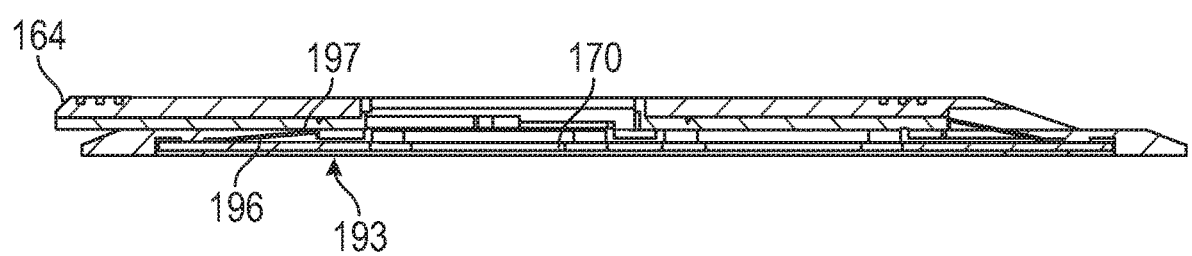
FIG. 20 is a cross-sectional view of the exemplary cover of FIG. 15 with a locking assembly actuated and door open.

As seen in FIG. 20, while the locking assembly 193 is in the actuated position, the door 164 may be slide from the closed position over the stop 197 and locking portion 196 and into the open position to expose opening 170 to allow access to the first compartment 24 and/or the second compartment 26 of the poke-thru fitting 10 and to the power receptacles 28 and/or data receptacles 30 installed therein in the manner shown in FIG. 1. Each door 164 may be advantageously sized so that, when moved to the open position shown in FIG. 12, only the power receptacles 28 and/or data receptacles 30 installed within either the first compartment 24 or the second compartment 26 are exposed. Thus, each door 164 may advantageously provide access to a single compartment. While the door 164 is in the open position, the locking assembly 193 remains in the actuated position with the door 164 maintaining the downward force on the locking portion 196. Once access to the power receptacles 28 and/or data receptacles 30 is no longer required, the door 164 may be returned to the closed position by moving the door 164 in sliding motion within the recess 163.

As discussed above, springs 191, shown in FIGS. 13 and 14, may be included to bias the doors 164 toward the closed position, in which case an opening force needs to be maintained on the door 164 to hold the door 164 in the open position shown in FIG. 20. When the door 164 is released, i.e., the opening force is removed, the bias provided by the springs 191, shown in FIGS. 13 and 14, causes the door 164 to automatically return to the closed position. This movement of the door 164 to the closed position also results in the locking assembly 193 automatically returning to the neutral position, with the resiliency of the spring clip 194 moving the locking portion 196 upward when the door 164 closes and is no longer maintaining the downward force on the locking portion 196. Thus, the door 164 automatically re-locks with the stop 197 preventing the door 164 from moving back to the open position until the locking portion 196 is again pressed downward into the actuated position.

The doors 164 of the cover plate 132 also advantageously eliminate unexpected slipping hazards for persons walking on a floor though which the poke-thru fitting 10 with cover plate 132 is installed by locking the doors 164 when the doors 164 are closed. In particular, since the cover plate 132 is configured to sit on an upper surface of the floor and since the doors 164 may be similarly sized to the bearing surface of shoes or other footwear, unintended movement of either of the doors 164 when stepped on could be potentially hazardous to an unexpected traveler walking on the floor. The cover plate 132 advantageously prevents such unintended slipping by biasing the doors 164 into the locked position when closed and by securing the doors 164 in the locked position.

Figure 21:
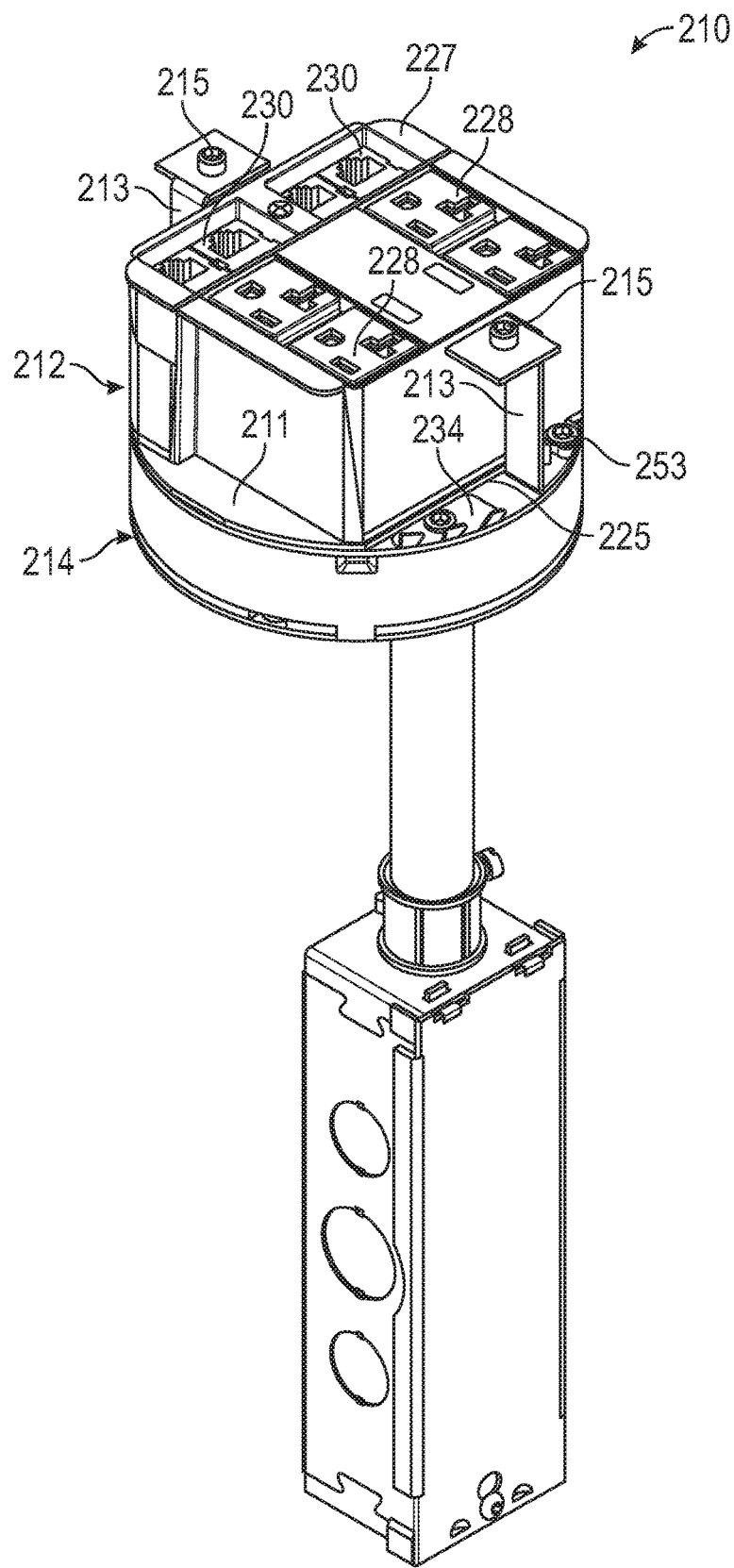
FIG. 21 is a perspective view of an exemplary poke-thru fitting in accordance with the present disclosure.
Figure 22:
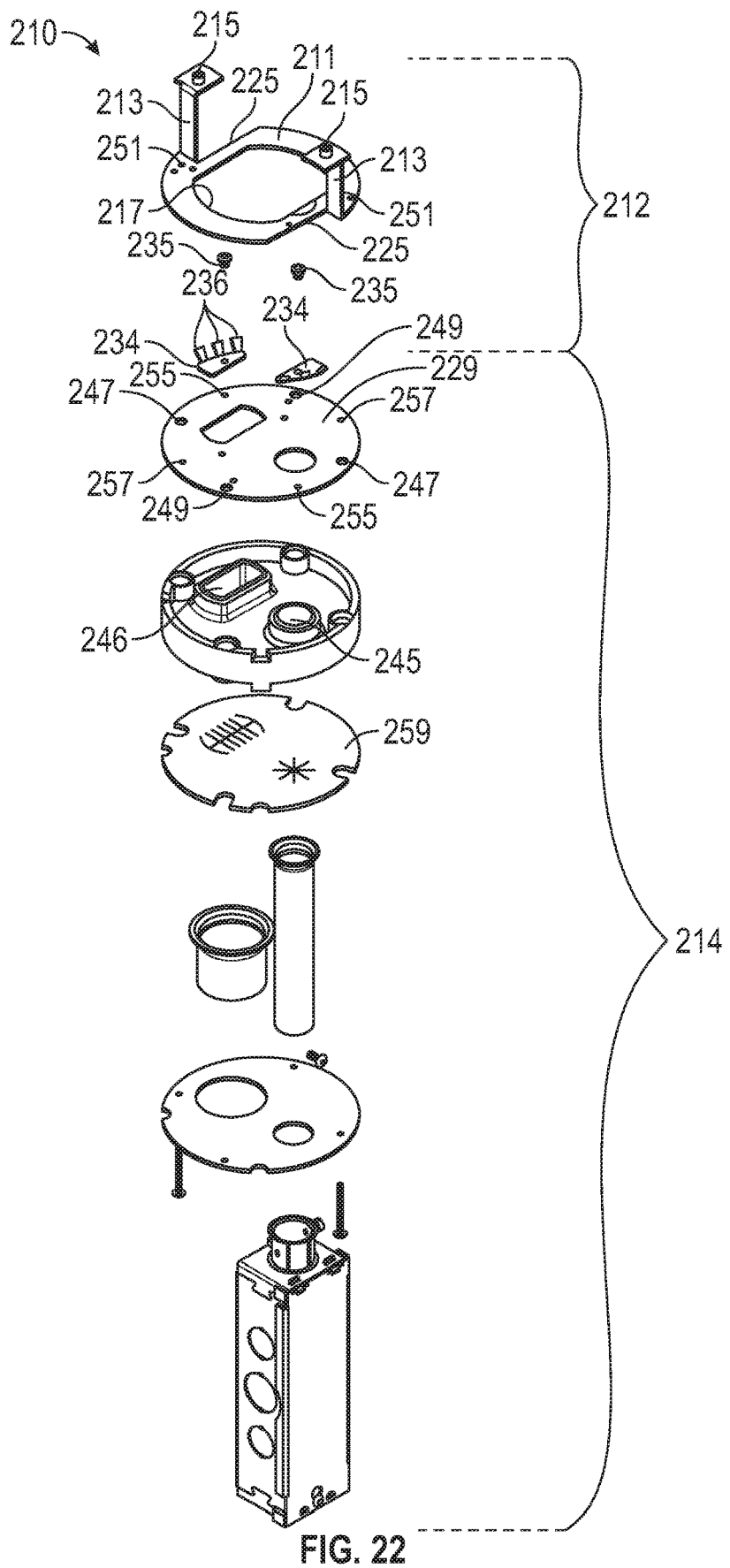
FIG. 22 is an exploded view of the poke-thru fitting shown in FIG. 21.

Referring to FIGS. 21 and 22, another exemplary in-floor fitting 210 in accordance with the present disclosure is shown. Like in-floor fitting 10, shown in FIG. 1, in-floor fitting 210 is a poke-thru fitting. However, it should be understood that various features of the present disclosure are not limited to poke-thru fittings and may be equally applicable to other types of in-floor fittings. In-floor fitting 210 includes an upper body 212 and a lower body 214.

The upper body 212 includes a base portion 211 that interfaces with the lower body 214 and legs 213 extending upward from the base portion 211. Each leg 211 includes a cover mount interface 215 at an upper end thereof configured to be disposed at the surface of the floor when the poke-thru fitting 210 is disposed in a hole in the floor. The cover mount interfaces 215 may include threaded bolt holes, screw holes, or the like for securing a cover thereto, such as the cover assembly 32 or the cover assembly 132 described above. The base portion 211 includes a central opening 217, shown in FIG. 22, configured to allow wiring and cabling to pass from the lower body 214 into the upper body 212. The base portion 211 also includes cut away portions 225 at a periphery of the base portion 211 adjacent the legs 213 configured to accommodate retention clips 234.

The upper body 212 defines a space above the base portion 211 and between the legs 213 that is configured to accommodate an electrical box 227. As seen in FIG. 21, the electrical box 227 is configured to accommodate power receptacles 228 and/or data receptacles 230 therein. The power receptacles 228 may be, for example, standard two or three prong 125-volt or 250-volt AC outlets. The data receptacles 230 may be, for example, Ethernet ports, USB sockets, telephone jacks, and/or any other similar data receptacle. The front surfaces of the power and data receptacles 228, 230 face upwards and are level with the cover mount interface 215 so that the power and data receptacles 228, 230 are disposed at the surface of the floor when the poke-thru fitting 210 is disposed in a hole in the floor.

Referring to FIG. 22, the lower body 214 includes an upper mounting plate 229 that interfaces with the base portion 211 of the upper body 212 and with retention clips 234. The upper mounting plate 229 includes a set of first body mounting holes 247 and a set of second body mounting holes 249. The first body mounting holes 247 are formed opposite one another on the upper mounting plate 229 proximate the periphery of the upper mounting plate 229. The second body mounting holes 249 are also formed opposite one another on the upper mounting plate 229 proximate the periphery of the upper mounting plate 229 and are equally spaced between the first mounting holes 247. Like the poke-thru fitting 10, shown in FIG. 1, the poke-thru fitting 210 is reconfigurable, with the upper body 212 being positional in multiple positions relative to the lower body 214, as will be discussed below. The first body mounting holes 247 align with mounting holes 251 of the base portion 211 when the upper body 212 is connected to the lower body 214 in a first configuration, shown in FIG. 24, with screws 253, shown in FIG. 21, securing the upper body 212 to the lower body 214 at the mounting holes 251 and first body mounting holes 247. Similarly, the second body mounting holes 249 align with mounting holes 251 of the base portion 211 when the upper body 212 is connected to the lower body 214 in a second configuration, shown in FIG. 25, with screws 253, shown in FIG. 21, securing the upper body 212 to the lower body 214 at the mounting holes 251 and second body mounting holes 249.

The upper mounting plate 229 also includes a set of first clip mounting holes 255 and a set of second clip mounting holes 257. The first clip mounting holes 255 are formed opposite one another on the upper mounting plate 229 proximate the periphery of the upper mounting plate 229 and are exposed by the cut away portions 225 of the base portion 211 when the upper body 212 is connected to the lower body 214 in the first configuration, shown in FIG. 24. The second clip mounting holes 257 are also formed opposite one another on the upper mounting plate 229 proximate the periphery of the upper mounting plate 229 and equally spaced between the first clip mounting holes 255. The second clip mounting holes 257 are configured to be exposed by the cut away portions 225 of the base portion 211 when the upper body 212 is connected to the lower body 214 in the second configuration, shown in FIG. 25.

The retention clips 234 are attached to the upper mounting plate 229 at the first clip mounting holes 255 in the first configuration or the second clip mounting holes 257 in the second configuration by screws 235. Each retention clip 234 includes a plurality of tabs 236 that extend outward past the periphery of the upper mounting plate 229 when the retention clip 234 is secured thereto. The cut away portions 225 of the base portion 211 may interface with the retention clips 234 to ensure proper positioning of the retention clips 234 on the upper mounting plate 229.

Still referring to FIG. 22, the lower body 214 includes a power port 245 and a data port 246 extending longitudinally through the lower body 214. The power port 245 and data port 246 are configured to allow power wiring and data wiring, respectively, to extend through the lower body 214 while keeping the power wiring and data wiring separated from one another. The lower body 214 may be made of intumescent material and/or may include a membrane 259 through which the wiring must pass to provide the poke-thru fitting 210 with the same or a better fire rating than the floor in which the poke-thru fitting 210 is installed, since intumescent material rapidly expands when heated to close openings through the poke-thru fitting 210 so that fire cannot pass therethrough.

Figure 23:
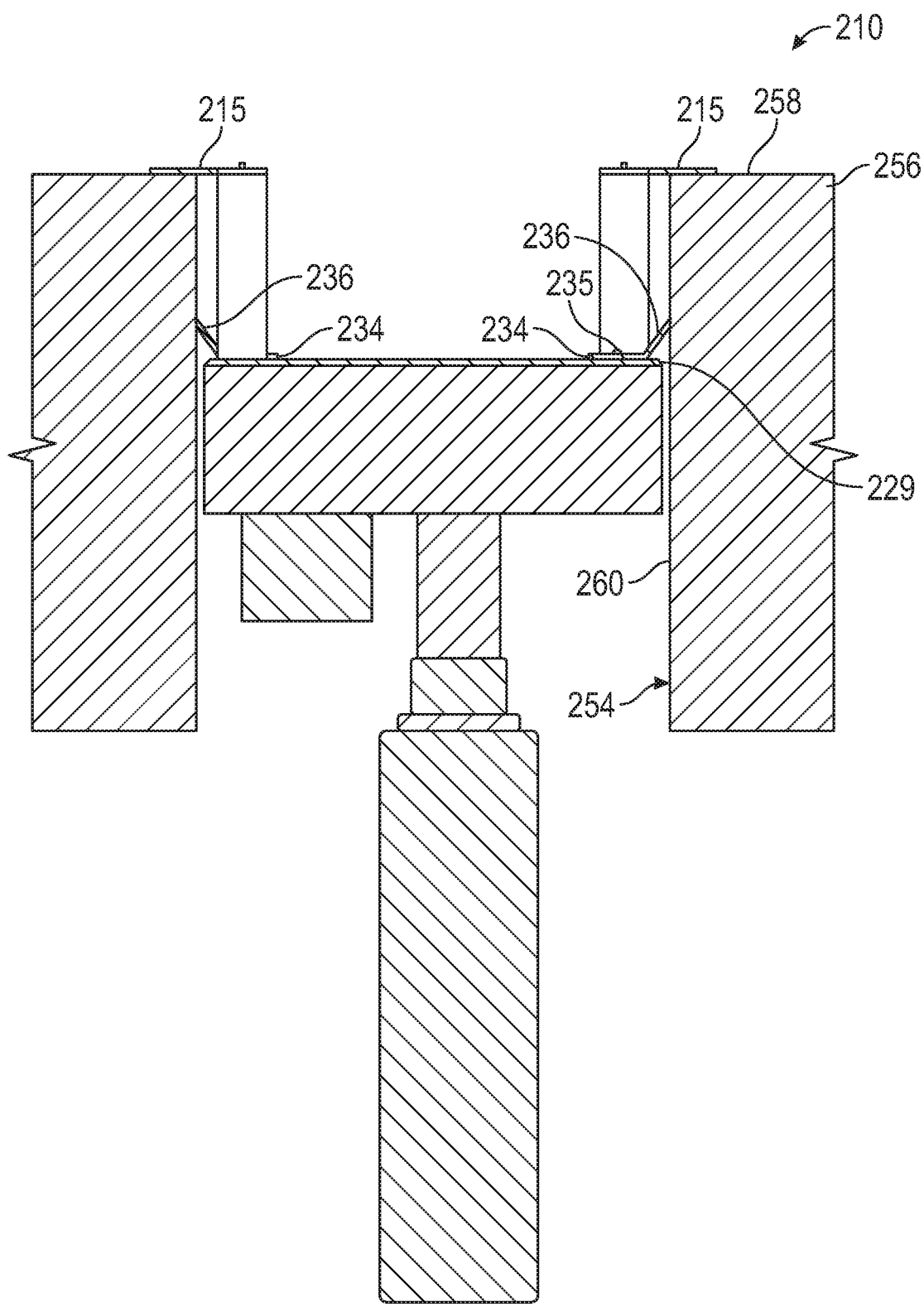
FIG. 23 is a side cross-sectional view of the poke-thru fitting shown in FIG. 21 installed in a floor.

Referring to FIG. 23, in operation, the poke-thru fitting 210 is installed in a hole 254 in a floor 256 by pushing the poke-thru fitting 210 downward into the hole 254 until the cover mount interface 215 is engages or is proximate an upper surface 258 of the floor 256. The tabs 236 of the retention clips 234 engage a wall 260 of the hole 254 to retain the poke-thru fitting 210 in the hole 254 in compliance with UL safety requirements. In particular, the engagement between the tabs 236 and the wall 260 allows the poke-thru fitting 210 to withstand 50 lbs of pulling force without becoming dislodged from the hole 254. This ensures that the poke-thru fitting 210 remains properly installed in the floor 256, even if a cable coming from the poke-thru fitting 210 is pulled.

Figure 24:
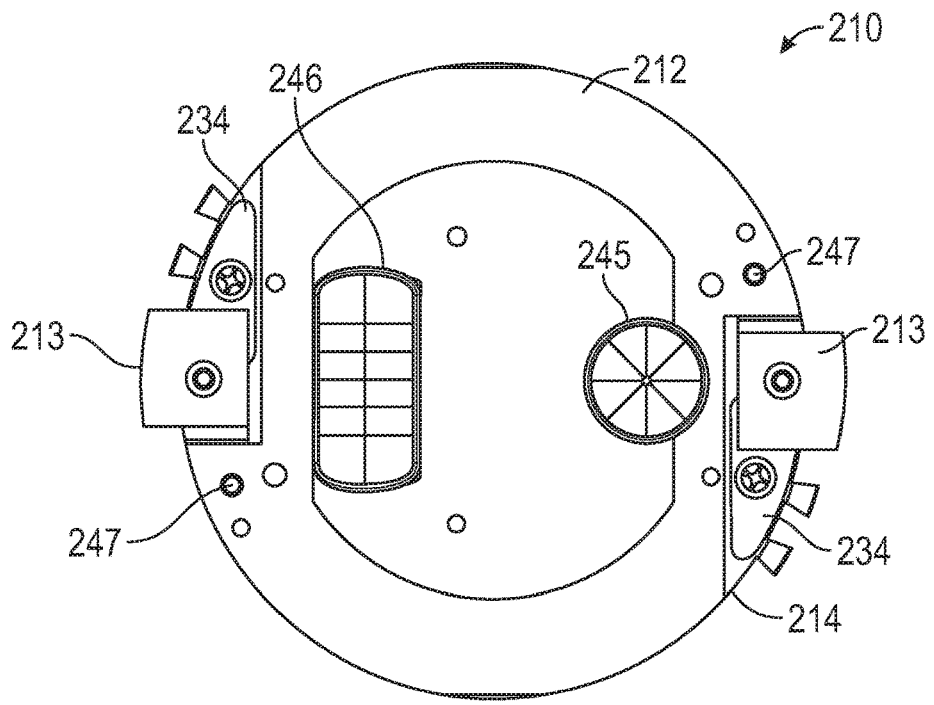
FIG. 24 is a top view of the poke-thru fitting shown in FIG. 21 in a first configuration.
Figure 25:
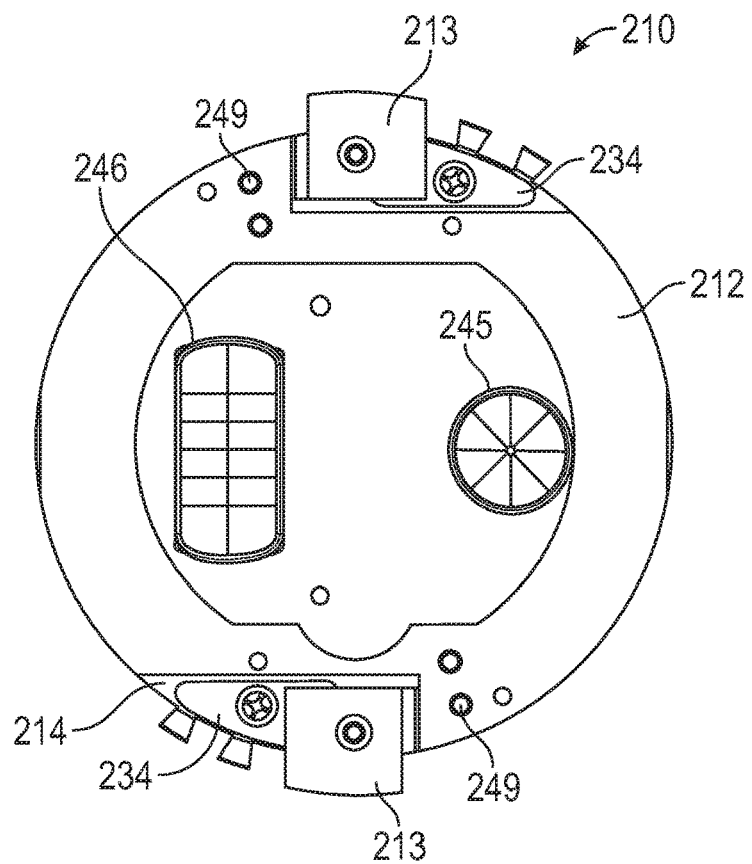
FIG. 25 is a top view of the poke-thru fitting shown in FIG. 21 in a second configuration.

The poke-thru fitting 210 has the ability to be uninstalled and reinstalled in the hole 254 (or another hole) while continuing to comply with the UL safety requirements for retention when installed in the hole 254 (or another hole). In particular, while the poke-thru fitting 210 is installed in the hole 254, the screws 235 securing the retention clips 234 to upper mounting plate 229 may still be accessed from above, as seen in FIGS. 24 and 25. This allows the screws 235 to be loosened and/or detached so that the retention clips 234 can be move to disengage the wall 260 of the hole 254. The poke-thru fitting 210 may then be lifted upward out of the hole 254 without having to overcome the retaining force generated by the engagement of the tabs 236 with the wall 260 and without damaging the tabs 236 of the retention clips 234.

The retention clips 234 may then be reattached to the upper mounting plate 229 by the screws 235 and the poke-thru fitting 210 may then be reinstalled in the hole 254 (or another hole) in the floor 256 by pushing the poke-thru fitting 210 downward into the hole 254 (or other hole) until the cover mount interface 215 is engages or is proximate an upper surface 258 of the floor 256. The tabs 236 of the retention clips 234 once again engage the wall 260 of the hole 254 to retain the poke-thru fitting 210 in the hole 254 in compliance with UL safety requirements.

Referring to FIG. 24, the poke-thru fitting 210 is shown in a first configuration with one leg 213 of the upper body 212 positioned next to the power port 245 of the lower body 214 and the other leg 213 of the upper body 212 positioned next to the data port 246 of the lower body 214. Thus, when the electrical box 227, shown FIG. 21, is positioned in the space defined by the upper body 212 as shown in FIG. 21, the data receptacles 230, shown in FIG. 21, are positioned above the data port 246 and the power receptacles 228, shown in FIG. 21, are positioned above the power port 245. In the first configuration, the upper body 212 is secured to the lower body 214 at the first body mounting holes 247 and the retention clips 234 are secured to the upper mounting plate 229 of the lower body 214 at the first clip mounting holes 255, shown in FIG. 22.

Referring to FIG. 25, the poke-thru fitting 210 is shown in a second configuration, with the upper body 212 rotated ninety degrees relative to the first configuration shown in FIG. 24 so that each of the power port 245 and the data port 246 of the lower body 214 is equally spaced between the legs 213 of the upper body 212. Thus, the second configuration allows the electrical box 227, shown FIG. 21, to be rotated ninety degrees relative to the first configuration, so that the relative position of the power receptacles 228 and data receptacles 230, shown in FIG. 21, within the electrical box 227 may be changed, with the power receptacles 228 and data receptacles 230 being connectable to wiring passing through the respective power port 245 and data port 246. In the second configuration, the upper body 212 is secured to the lower body 214 at the second body mounting holes 249 and the retention clips 234 are secured to the upper mounting plate 229 of the lower body 214 at the second clip mounting holes 257, shown in FIG. 22.

The poke-thru fitting 210 may advantageously be reconfigured between the first configuration shown in FIG. 24 and the second configuration shown in FIG. 25, and vice versa, by removing the screws 253, rotating the upper body 212 relative to the lower body 214, and reinstalling the screws 253 into the appropriate holes as described above. This reconfiguration may be done whenever the poke-thru fitting 210 is uninstalled from hole 254 in the floor 256, for example initially prior to installation or when removed from the hole 254 as discussed above. Although only first and second configurations have been described for simplicity, it should be apparent from the present disclosure, that third and fourth configurations may be achieved by continuing to rotate the upper body 212 relative to the lower body 214 at ninety-degree intervals. Thus, the poke-thru fitting 210 includes four configurations at ninety-degree intervals of rotation relative to one another. It should also be apparent from the present disclosure that the number of configurations may be increased and the degree or rotation between configurations decreased by providing additional mounting holes on the lower body 214.

Accordingly, the poke-thru fitting 210 may advantageously be installed/reinstalled and/or configured/reconfigured to accommodate a variety of different wiring needs as wiring requirements and/or wiring standards change, while still complying with UL safety requirements.

While the preferred embodiments of the devices and methods have been described in reference to the environment in which they were developed, they are merely illustrative of the principles of the disclosure. As will be recognized by those of ordinary skill in the pertinent art, numerous changes and modifications may be made to the above-described embodiments of the present disclosure without departing from the spirit of the invention. Accordingly, the particular embodiments described in this specification are to be taken as merely illustrative and not limiting.

What is claimed is:
1. An in-floor electrical fitting comprising:
  a body forming a compartment, the body configured to be disposed in a hole in a floor;
  a flange formed at an upper end of the body and having at least one opening into the compartment, the flange configured to sit on a surface of the floor when the body is disposed in the hole; and
  at least one detachable retention clip secured to the body and accessible through the at least one opening in the flange,
  wherein the at least one detachable retention clip is movable between a first position in which a portion of the at least one detachable retention clip extends outwardly past a periphery of the body to engage a side of the hole and a second position in which the portion of the at least one detachable retention clip is moved inward from the periphery of the body and is disengaged from the side of the hole.
2. The in-floor electrical fitting according to claim 1, wherein the at least one detachable retention clip comprises two detachable retention clips.

3. The in-floor electrical fitting according to claim 2, wherein the two detachable retention clips are on opposite sides of the body.

4. The in-floor electrical fitting according to claim 1, wherein the portion of the at least one detachable retention clip includes a plurality of tabs.

5. The in-floor electrical fitting according to claim 1, wherein the at least one detachable retention clip has at least one alignment feature configured to engage a corresponding alignment feature on the body when the at least one detachable retention clip is in the first position.

6. The in-floor electrical fitting according to claim 1, wherein the body comprises:
 a lower portion including first and second channels extending therethrough; and
 an upper portion detachably connected to the lower portion, the upper portion including the flange and a divider dividing the at least one opening into a first opening and a second opening;
 wherein an angular position of the upper portion is reconfigurable relative to the lower portion into at least two distinct orientations.

7. The in-floor electrical fitting according to claim 6, wherein the upper portion is reconfigurable between a first position in which the divider is positioned between the first and second channels so that the first channel is located below the first opening and the second channel is located below the second opening and a second position in which the divider is positioned over both the first and second channels so that a first portion of the first channel and a first portion of the second channel are located below the first opening and a second portion of the first channel and a second portion of the second channel are located below the second opening.

8. The in-floor electrical fitting according to claim 1, further comprising a cover configured to be disposed on an upper surface of the flange, the cover including at least one sliding door providing access to the compartment when in an open position and preventing access to the compartment when in a closed position.

9. The in-floor electrical fitting according to claim 8, wherein the cover includes a locking mechanism that automatically locks the least one sliding door when the at least one sliding door is in the closed position.

10. An in-floor electrical fitting comprising:
 a lower body including first and second channels extending therethrough; and
 an upper body detachably connected to the lower body, the upper body including a flange formed at an end of the upper body distal from the lower body, the flange having an opening divided into a first compartment and a second compartment by a divider;
 wherein an angular position of the upper body is reconfigurable relative to the lower body into at least two different orientations; and
 wherein the upper body is reconfigurable between a first position in which the divider is positioned between the first and second channels so that the first channel is located below the first compartment and the second channel is located below the second compartment and a second position in which the divider is positioned over both the first and second channels so that a first portion of the first channel and a first portion of the second channel are located below the first compartment and a second portion of the first channel and a second portion of the second channel are located below the second compartment.

11. The in-floor electrical fitting according to claim 10, wherein the upper body comprises a mounting plate at an end of the upper body proximate the lower body, the mounting plate detachably connecting the upper body to the lower body.

12. The in-floor electrical fitting according to claim 11, further comprising at least one detachable retention clip secured to the mounting plate and accessible through the opening in the flange,
 wherein the at least one detachable retention clip is movable between a first position in which a portion of the at least one detachable retention clip extends outwardly past a periphery of the mounting plate and a second position in which the portion of the at least one detachable retention clip is moved inward from the periphery of the mounting plate.

13. The in-floor electrical fitting according to claim 12, wherein the at least one detachable retention clip comprises two detachable retention clips.

14. The in-floor electrical fitting according to claim 13, wherein the two detachable retention clips are on opposite sides of the mounting plate.

15. The in-floor electrical fitting according to claim 14, wherein the portion of the at least one detachable retention clip includes a plurality of tabs.

16. The in-floor electrical fitting according to claim 14, wherein the at least one detachable retention clip has at least one alignment feature configured to engage a corresponding alignment feature on the mounting plate when the at least one detachable retention clip is in the first position.

17. The in-floor electrical fitting according to claim 10, further comprising a cover configured to be disposed on an upper surface of the flange, the cover comprising:
 a first sliding door providing access to the first compartment when in an open position and preventing access to the first compartment when in a closed position; and
 a second sliding door providing access to the second compartment when in an open position and preventing access to the second compartment when in a closed position.

18. The in-floor electrical fitting according to claim 17, wherein the cover includes locking mechanisms that automatically lock the first and second sliding doors when in the closed position.

19. An in-floor electrical fitting comprising:
 a lower body including first and second channels extending therethrough;
 an upper body detachably connected to the lower body, the upper body including a flange formed at an end of the upper body distal from the lower body, the flange having an opening providing access to a compartment formed in at least one of the upper body or the lower body;
 at least one detachable retention clip secured to the body and accessible through the opening in the flange, the at least one detachable retention clip being movable between a first position in which a portion of the at least one detachable retention clip extends outwardly past a periphery of the body and a second position in which the portion of the at least one detachable retention clip is moved inward from the periphery of the body; and
 a cover configured to be disposed on an upper surface of the flange, the cover including at least one sliding door providing access to the compartment when in an open position and preventing access to the compartment when in a closed position;

wherein the cover includes a locking mechanism that automatically locks the least one sliding door in the closed position when the at least one sliding door is moved to the closed position; and wherein an angular position of the upper body is reconfigurable relative to the lower body into at least two different orientations.

\* \* \* \* \*